Dec. 1, 1964  R. W. MARQUISS  3,159,100
METHOD AND APPARATUS FOR FORMING INDICIA ON ARTICLES
Filed Feb. 8, 1963  14 Sheets-Sheet 1
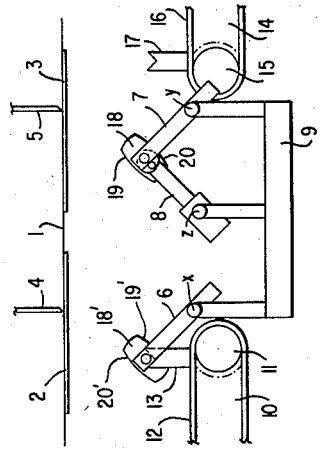
FIG. IA
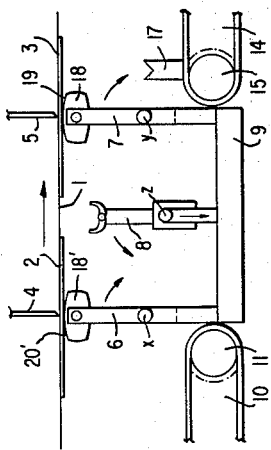
FIG. IB
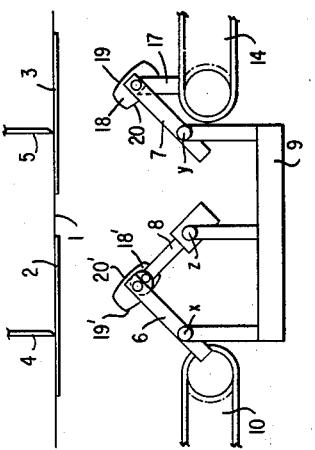
FIG. IC
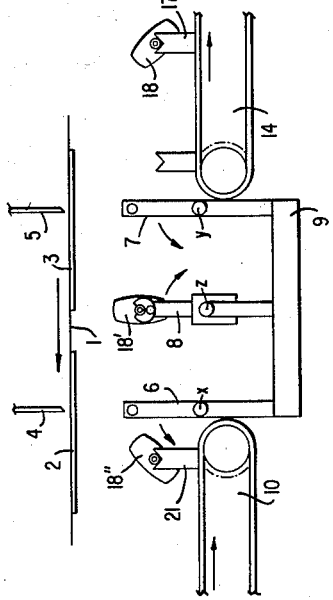
FIG. ID
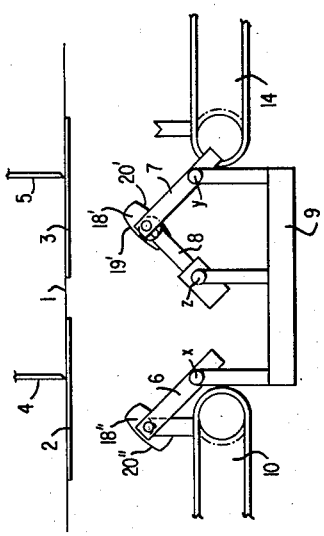
FIG. IE
INVENTOR.
ROBERT W. MARQUISS
BY
Burns, Doane, Benedict,
Swecker and Mathis
ATTORNEYS Dec. 1, 1964 R. W. MARQUISS 3,159,100
METHOD AND APPARATUS FOR FORMING INDICIA ON ARTICLES
Filed Feb. 8, 1963 14 Sheets-Sheet 2

INVENTOR.
ROBERT W. MARQUISS
BY
Burns, Doane, Benedict,
Swecker and Mathis
ATTORNEYS Dec. 1, 1964 R. W. MARQUISS 3,159,100
METHOD AND APPARATUS FOR FORMING INDICIA ON ARTICLES
Filed Feb. 8, 1963 14 Sheets-Sheet 3

INVENTOR.
ROBERT W. MARQUISS
BY
Burns, Doane, Benedict,
Swecker and Mathis
ATTORNEYS

INVENTOR.
ROBERT W. MARQUISS
BY
ATTORNEYS

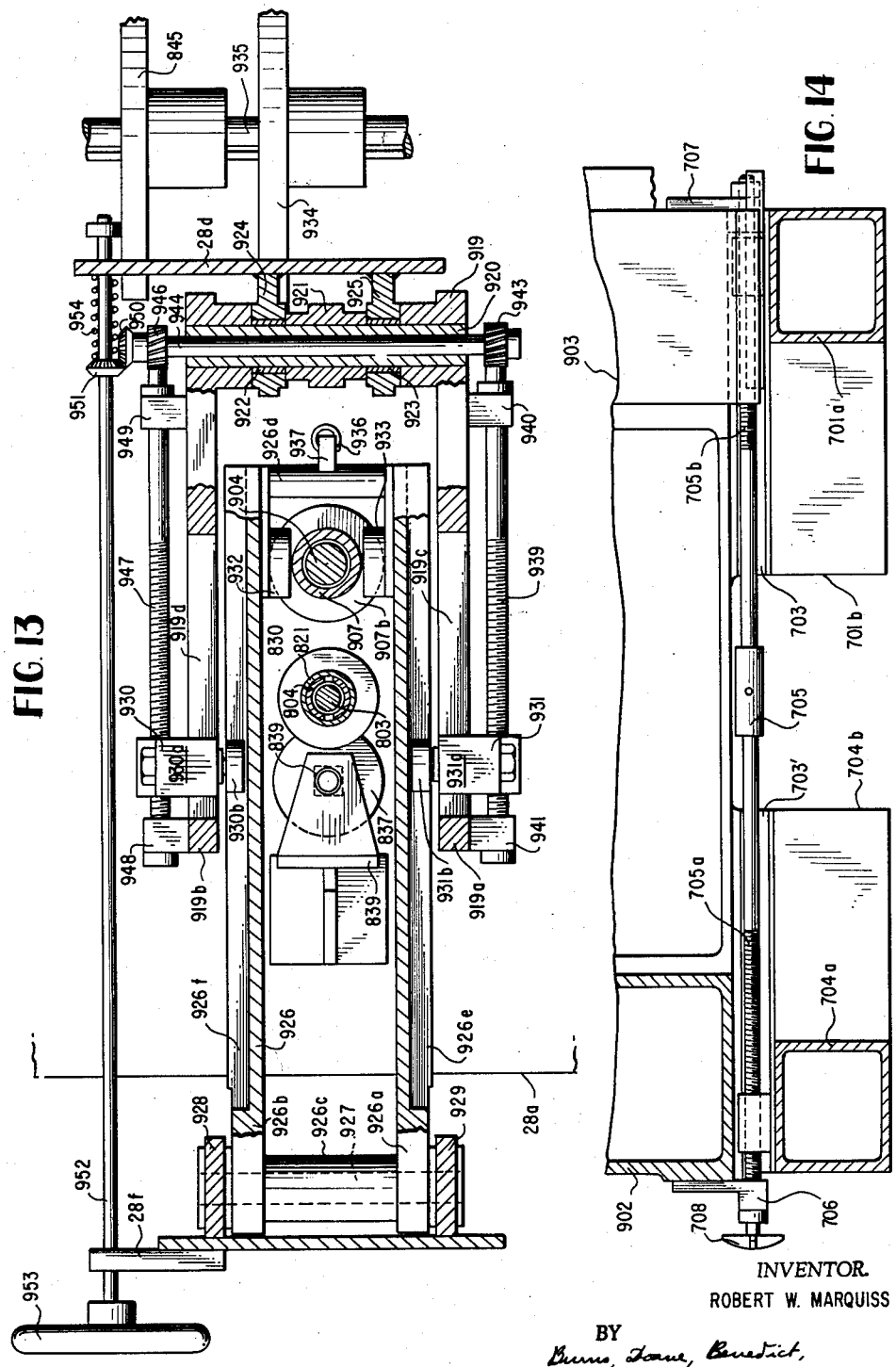

Dec. 1, 1964  R. W. MARQUISS  3,159,100
METHOD AND APPARATUS FOR FORMING INDICIA ON ARTICLES
Filed Feb. 8, 1963  14 Sheets-Sheet 8

INVENTOR.
ROBERT W. MARQUISS
BY
Burns, Doane, Benedict,
Swecker and Mathis
ATTORNEYS Dec. 1, 1964   R. W. MARQUISS   3,159,100
METHOD AND APPARATUS FOR FORMING INDICIA ON ARTICLES
Filed Feb. 8, 1963   14 Sheets-Sheet 9

INVENTOR.
ROBERT W. MARQUISS
BY
Burns, Doane, Benedict,
Swecker and Mathis
ATTORNEYS

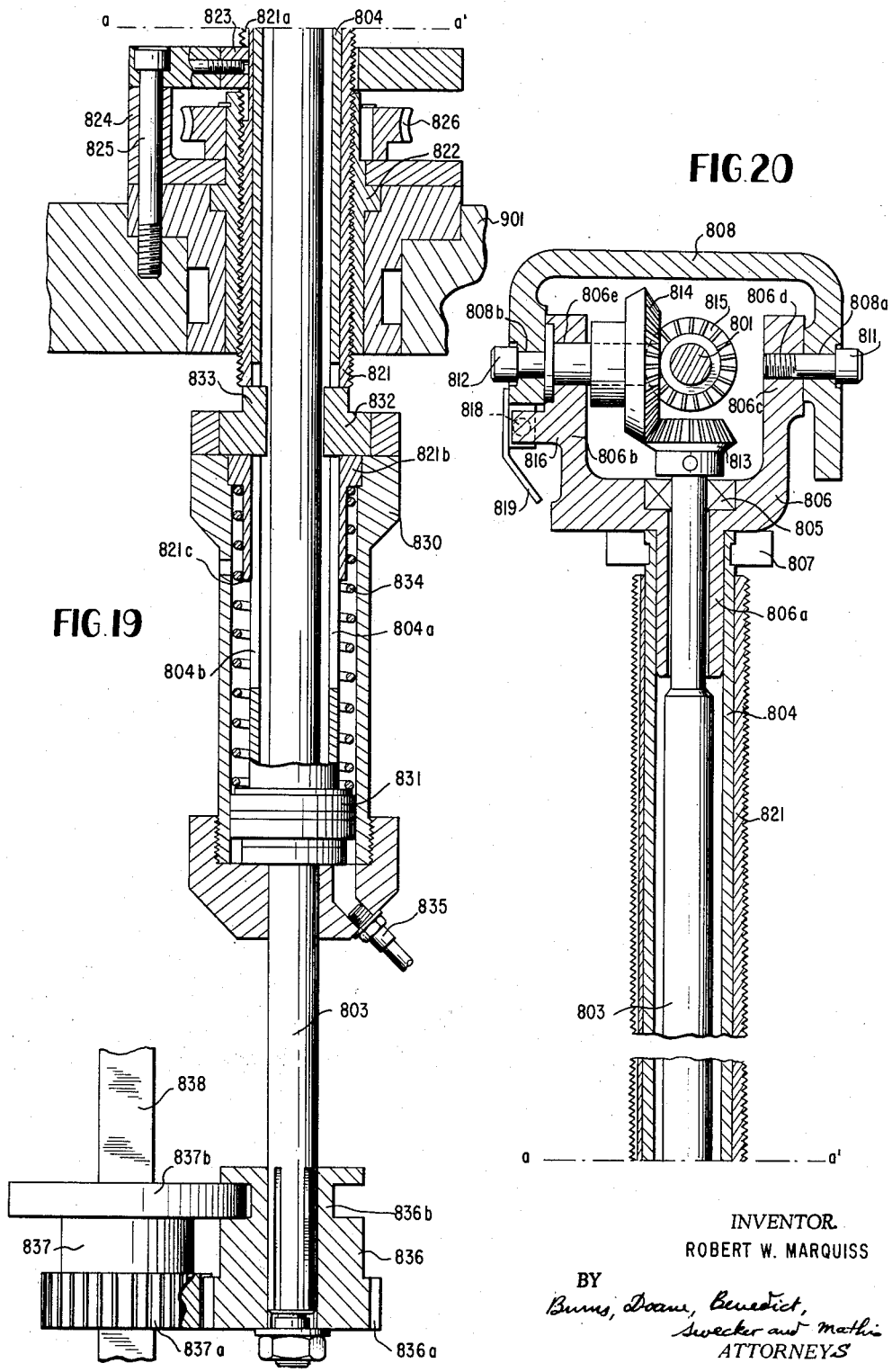

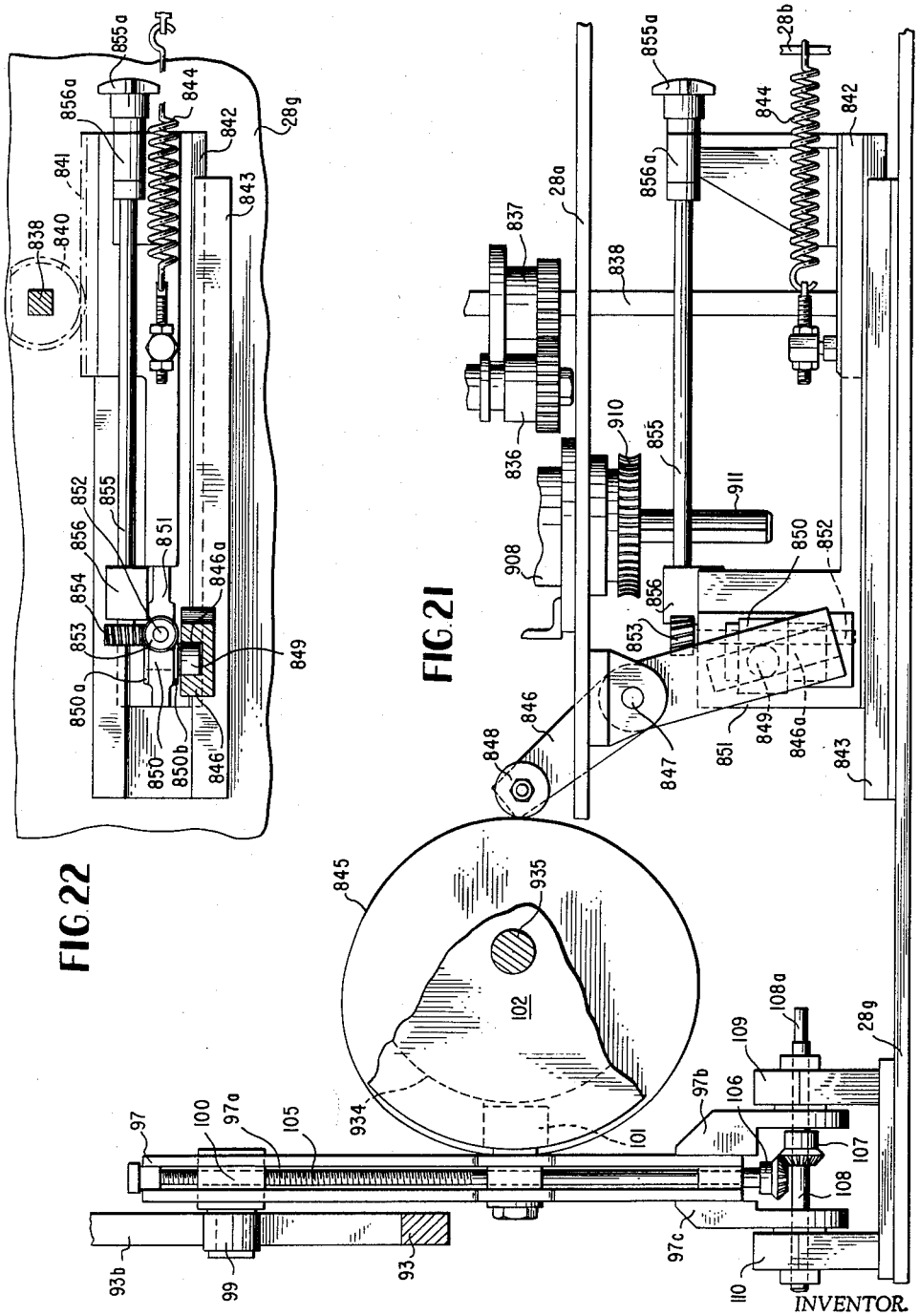

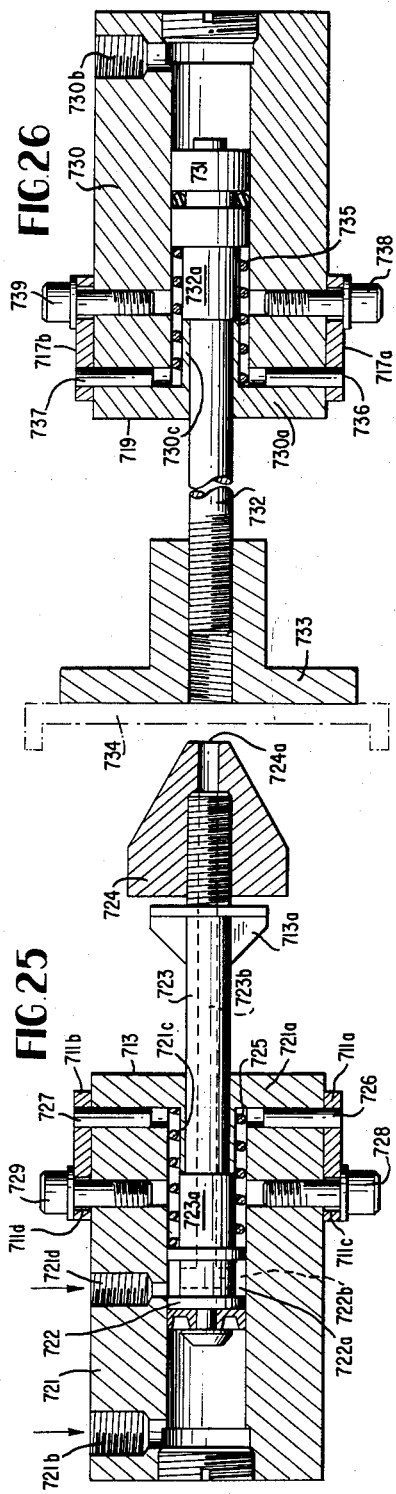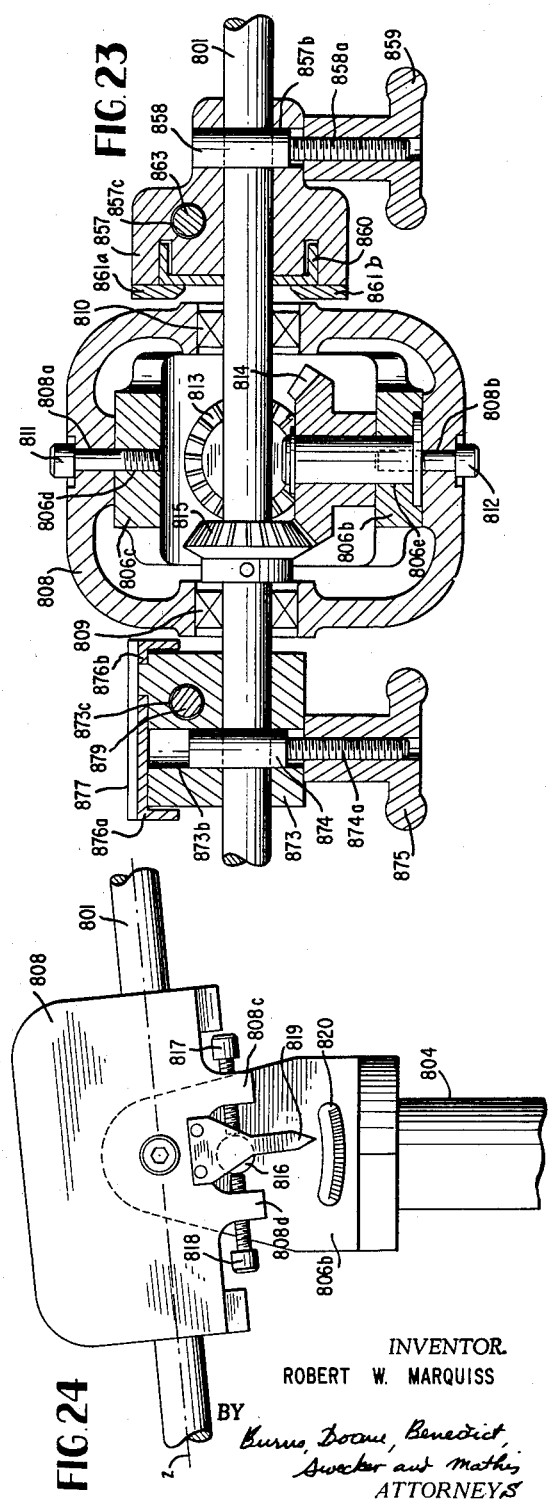
INVENTOR.
ROBERT W. MARQUISS
BY
Burns, Doane, Benedict,
Swecker and Mathis
ATTORNEYS

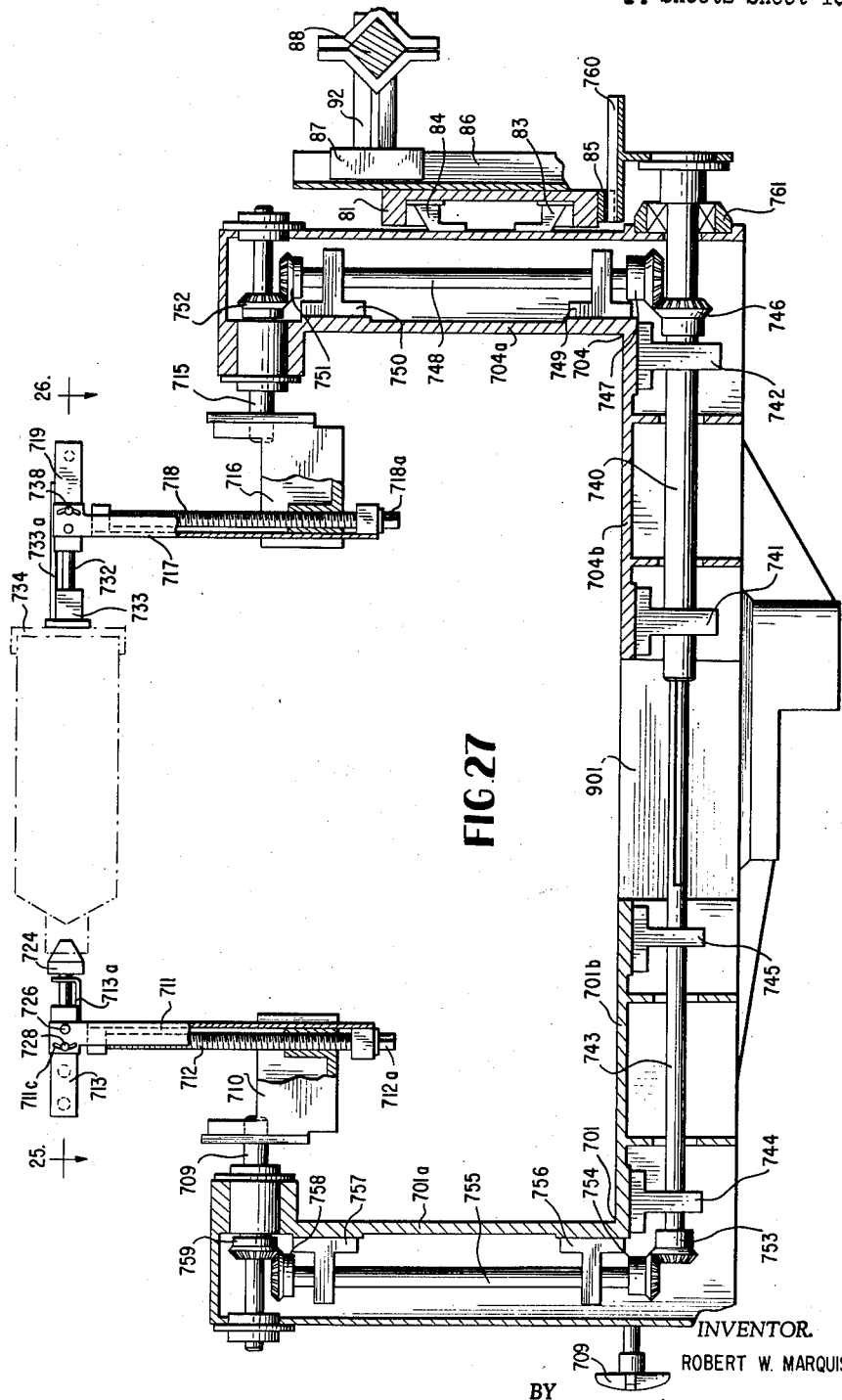

Dec. 1, 1964  R. W. MARQUISS  3,159,100
METHOD AND APPARATUS FOR FORMING INDICIA ON ARTICLES
Filed Feb. 8, 1963  14 Sheets-Sheet 14

INVENTOR.
ROBERT W. MARQUISS
BY
Burns, Doane, Benedict,
Swecker and Mathis
ATTORNEYS

United States Patent Office 3,159,100
Patented Dec. 1, 1964

3,159,100
METHOD AND APPARATUS FOR FORMING
INDICIA ON ARTICLES
Robert W. Marquiss, Agawam, Mass., assignor to Monsanto Company, St. Louis, Mo., a corporation of Delaware
Filed Feb. 8, 1963, Ser. No. 257,228
11 Claims. (Cl. 101—40)

This invention pertains to methods and apparatus for forming indicia on articles. In particular it pertains to a technique uniquely adapted to the silk screen printing of indicia on each of two cylindrically curved article suraces, the curvature axes of which may be different. The invention affords maximum utility in the forming of indicia on such articles where the axes of curvature of two surfaces to receive indica are mutually inclined.

Modern fabrication techniques have produced a variety of articles, such as molded plastic containers, having a plurality of surfaces to be printed or other wise provided with indicia. Such articles frequent have two oppositely disposed surfaces which are cylindrically curved in character but which have different axes of surface curvature. As will be appreciated, with such articles, it is not possible to merely rotate them about a central axis so as to effect the printing of indicia upon both surfaces. Thus, the forming of indicia on such multisurfaced articles has provided a formidable challenge from the standpoint of providing techniques for the handling and orienting of articles for the formation of indicia on two separate surfaces while retaining a high degree of indicia forming accuracy. Especially serious problems have been presented in the forming of indica on plural article surfaces having mutually inclined axes of curvature.

Article orienting mechanisms heretofore incorporated in indicia forming mechanisms have often effected the reorientation of articles in respect to the devices upon which they were supported. Such mechanisms, when subjected to sustained, high speed operation, have a tendency to under mechanical wear so as to introduce errors and inaccuracy in the article orienting operation.

A particularly vexing problem has resided in the making or effecting of apparatus adjustments to properly correlate the operation of indicia forming means and article carrying means. In general, it has been necessary for such adjustments to be made while the indicia forming means and article carrying means were stationary. As will be appreciated, such adjusting techniques are tedious and time consuming in character and do not necessarily provide the adjustments which will properly correlate apparatus components when they are in motion.

In recognition of the need for an improved technique for the forming of indicia on multiplesurfaced articles of the type heretofore described, it is a principal object of this invention to provide an indica forming method and indicia forming apparatus, which substantially obviate functional and structural problems of the type described.

A foremost object of the invention is to provide an indicia forming technique especially suited for the forming of indicia on two, spaced, cylindrically curved article surfaces by means wherein an article is supported on first article carrying means and moved so as to bring a first article surface into tangential, indicia forming contact with indicia forming means, and wherein the article is transferred to second article carrying means upon which it is moved so as to bring a second article surface into tangential, indicia forming contact with indicia forming means. A particular object of the invention is to provide such a technique which is adapted to the forming of indicia on articles having two cylindrically curved surfaces to receive indicia, the curvature axes of which surfaces are mutually inclined.

A further object of the invention is to provide a technique for effecting the reorientation of an article after indicia has been formed on one surface and before it is formed on another surface in such a manner as to obviate the necessity for changing the position of the article in relation to article moving and supporting means upon which it is mounted while being carried by such supporting means.

A still further object of the invention is to effect the reorientation of an article while it is being transferred from one article carying means to another in such a manner as to position the article on the second article carrying means such that a surface to receive indicia is appropriately disposed for tangential, indicia forming contact with indicia forming means.

Yet another object of the invention is to provied a method of moving articles in tangential, indicia forming contact with indicia forming means, wherein an article is moved through a first arc to receive indicia on one cylindrically curved face, is moved through a second arc to receive indicia on a second cylindrically curved face, and is moved between the first and second arcs so as to properly orient the article to receive indicia on its second face while moving through the second arc.

It is also an object of the invention to provide an improved apparatus which enables the progressive varying of the relative rates of movement of indicia forming means and article carrying means while such means are in motion.

Still another object of the invention is to provide an apparatus wherein article engaging components engage and support articles during indicia forming and transfer operations so as to avoid disturbing indicia which have been formed on portions of article surfaces.

A final object of the invention is to provide methods and apparatus which enable the forming of multiple indicia patterns on articles, while they are being transported at a rapid rate, in such a manner as to insure sustained, indicia forming accuracy over prolonged periods of operation and so as to enable indicia to be simultaneously formed on a plurality of articles.

An apparatus for accomplishing certain of the objects of this invention is adapted to move articles in substantially tangential, indicia forming contact with indicia forming means so as to form indicia on a first surface of an article which is curved in substantially uniform, cylindrical curvature about a first surface axis and so as to also form indicia on a second surface of an article which is curved in substantially uniform cylindrical curvature about a second surface axis. This apparatus comprises first article carrying means adapted to move an article through a first arc about a first arc axis and adapted to support an article while moving through this first arc with its first surface facing generally away from the first arc axis so as to be disposed for substantially tangential indicia forming contact with a portion of the indicia forming means. The article is supported on the first article carrying means so that the first surface axis and the first arc axis substantially coincide. The apparatus further includes second article carrying means adapted to move an article through a second arc about a second arc axis and adapted to support the article with its second surface facing generally away from the second arc axis so as to be disposed for a substantially tangential, indicia forming contact with a portion of the indicia forming means. The article is supported on the second article carrying means so that the second surface axis and the second arc axis substantially coincide. Transfer means are included in the apparatus, which transfer means is adapted to receive an article from the first article carrying means after the first surface thereof has received indicia and to move the article to the second article carrying means. The transfer means is adapted to position the article on the second article carrying means so that the article may be moved by the second article carrying means, through the aforesaid second arc with its second surface facing generally away from the second arc axis and with its second surface axis substantialy coinciding with the aforesaid second arc axis.

Also involved in the invention is a method for moving articles in substantially tangential, indicia forming contact with indicia forming means so as to form indicia on first and second article surfaces of the type heretofore described. This method entails moving each article through a first arc, with the surface curvature axis of the first article surface substantially coinciding with the curvature, i.e. pivot axis, of the first arc. Indicia is formed on the first surface of each article while it moves through this first arc. The article is moved through a second arc, with the surface curvature axis of the second article surface substantially coinciding with the curvature, i.e. pivot axis, of the second arc. Indicia is formed on the second surface of the article while it moves through this second arc. The article is moved between the first arc and second arc so as to bring the article into a position where its second surface is aligned to traverse the second cylindrical path in the manner above described.

Where the invention is utilized to an optimum degree in the forming of indicia on articles having mutually inclined, first and second surface axes, significant method and apparatus aspects of the invention reside in a technique wherein an article is moved through a third arc about a pivot axis. Where the invention is employed with symmetrical articles and where the indicia forming means comprises a horizontally moving, indicia forming surface, this pivot axis is vertically inclined and lies in a first, vertical plane disposed between, equidistant from, and parallel to both the first and second arc axes. This pivot axis is defined by the intersection of the first vertical plane with a second plane which passes between the first and second article surfaces and is symmetrically disposed in relation to the first and second article surface axes when the article is positioned at each extremity of the third arc.

An apparatus for accomplishing objects of the invention pertaining to the coordinating of the operation of indicia forming means and article carrying means is characterized by means for progressively varying the relative rates of movement of the indicia forming means and the article carrying means while the indicia forming means and article carrying means are in motion.

In describing the invention, reference will be made to preferred embodiments illustrated in the accompanying drawings. In these drawings:

FIGURES 1-A through 1-E schematically represent sequential positions of principal apparatus components during the forming of indicia on two oppositely disposed, cylindrically curved, article surfaces;

FIGURE 2 schematically represents the sequential position of an article on the FIGURE 1 apparatus as the article moves through an entire indicia forming cycle. The article represented in FIGURE 2 is characterized by having two cylindrically curved surfaces, the curvature axes of which are mutually inclined;

Figure 2:
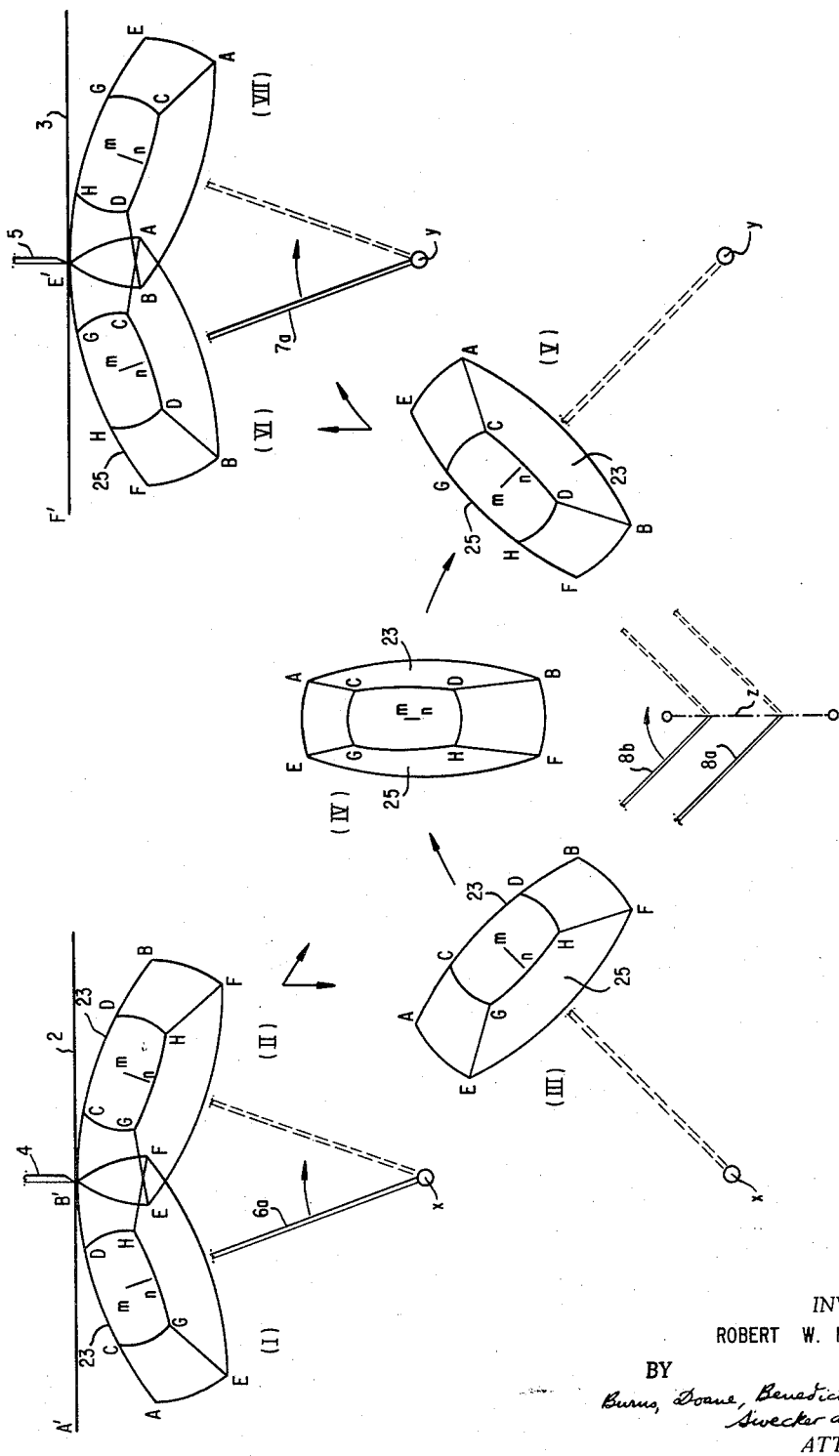
Figure 5:
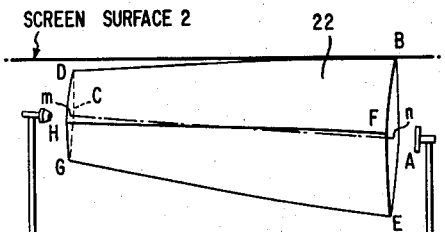
Figure 6:
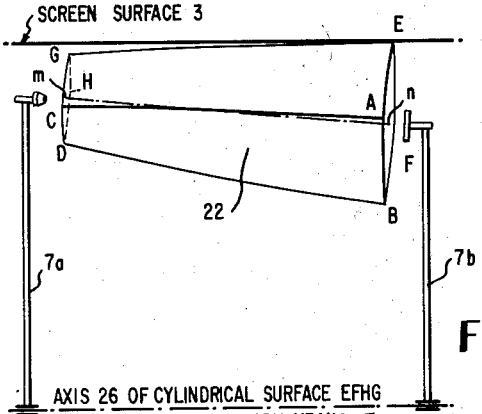
Figure 7:
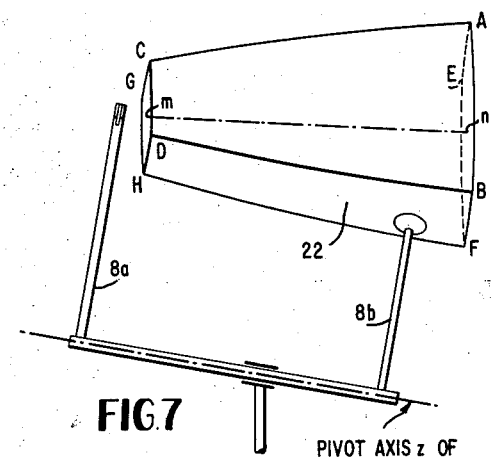
Figure 8:
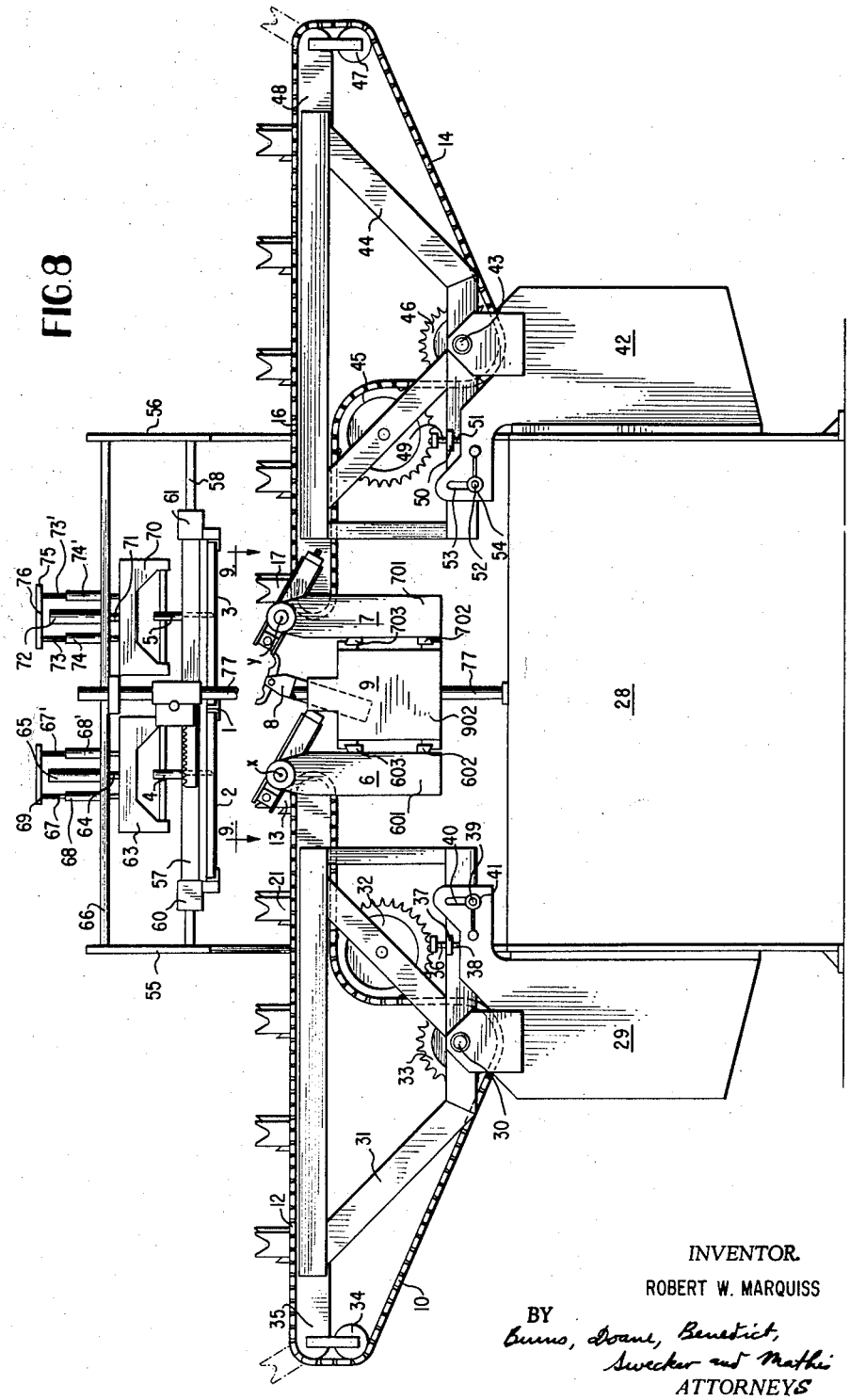
Figure 9:
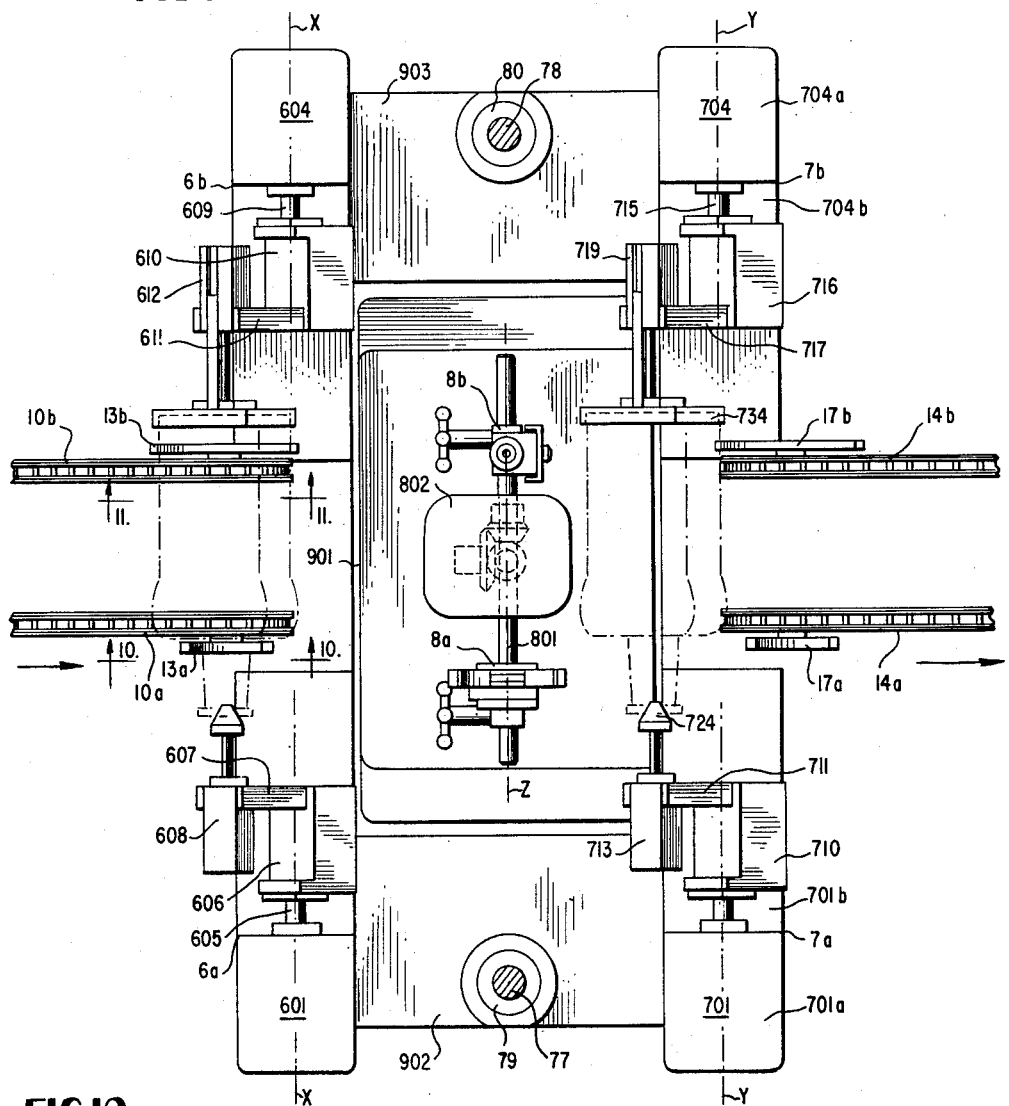
Figure 10:
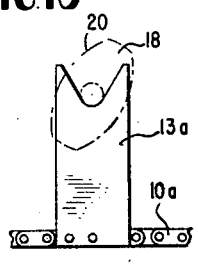
Figure 11:
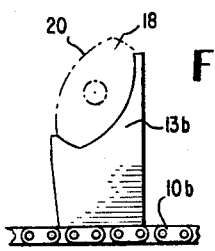
Figure 12:
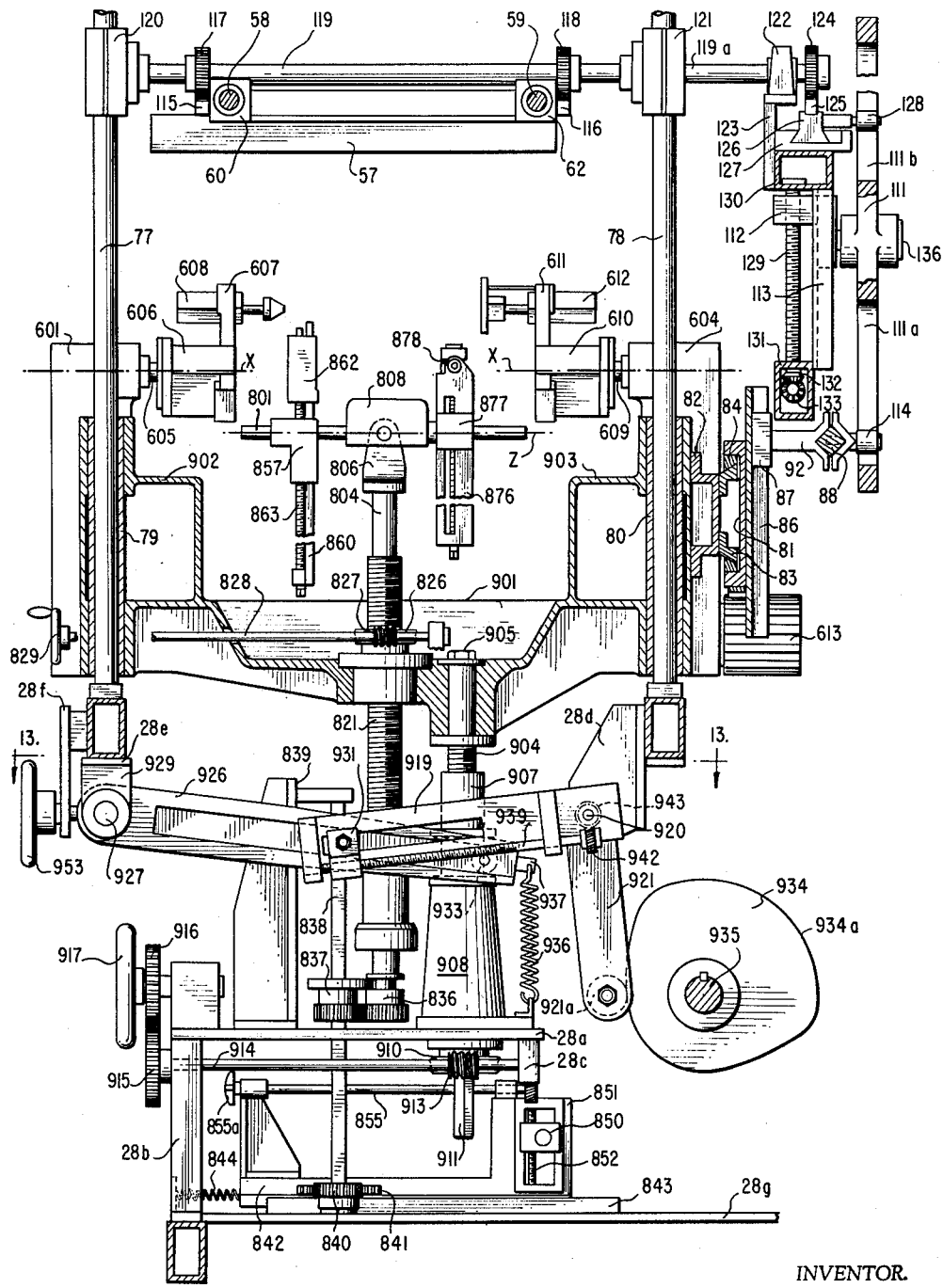
Figure 15:
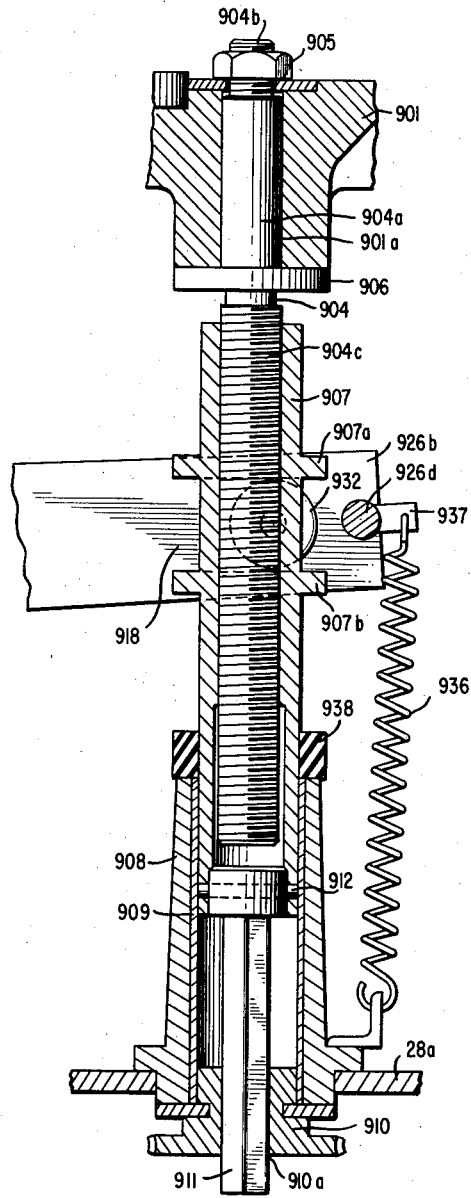
Figure 16:
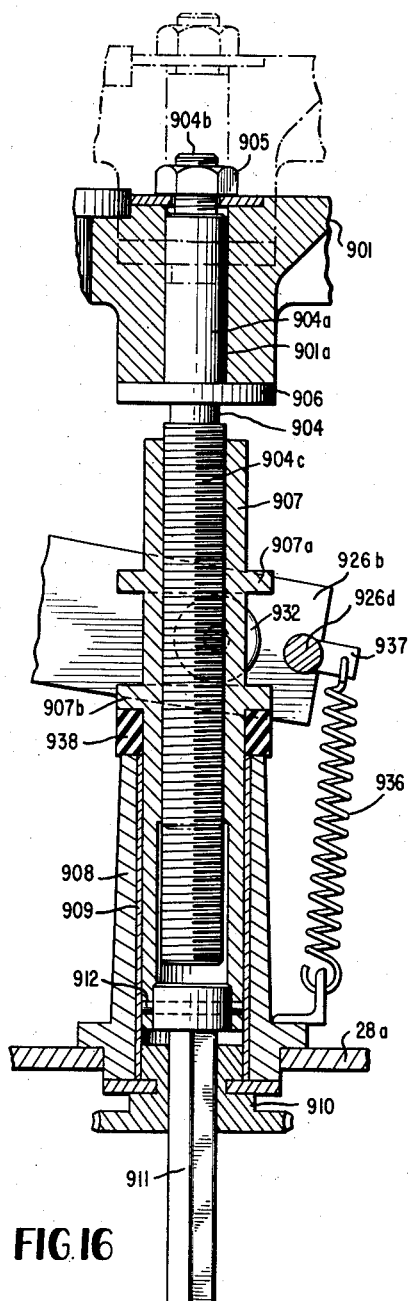
Figure 17:
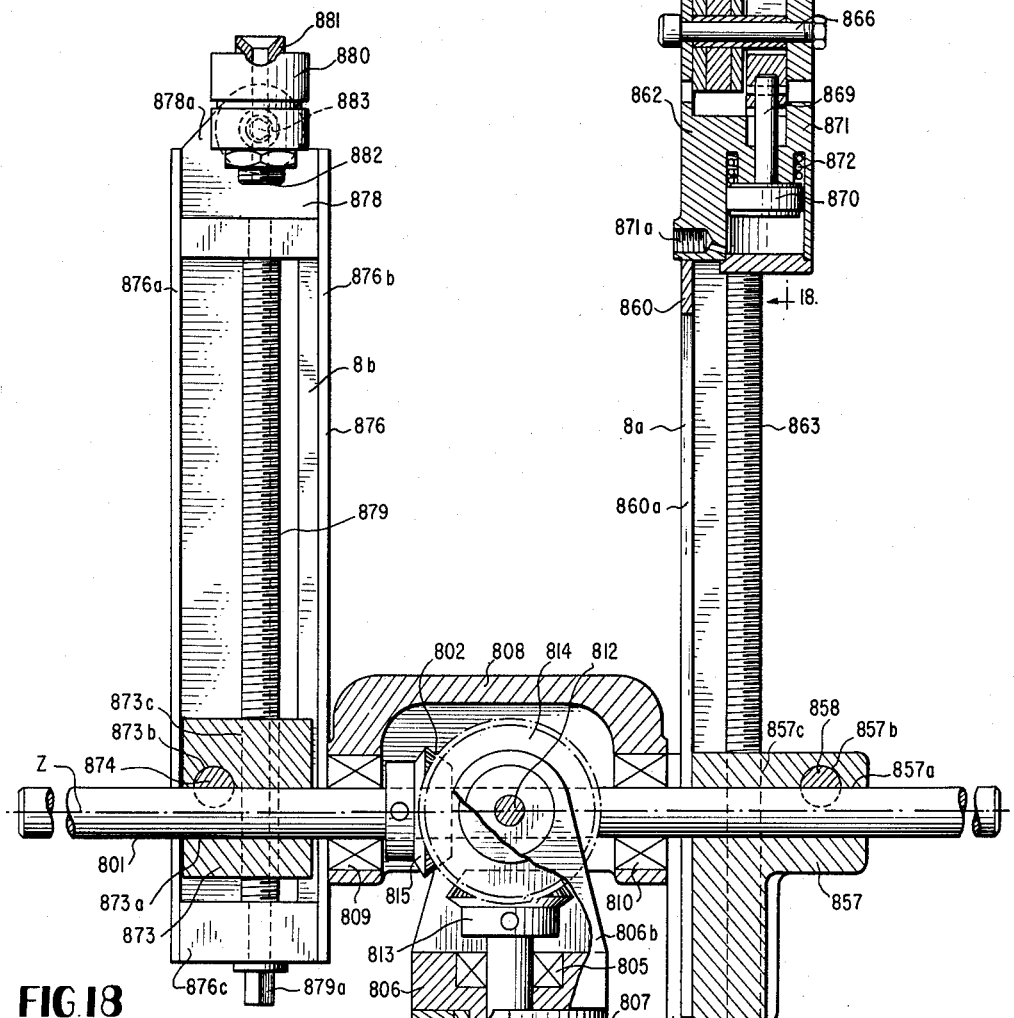
Figure 18:
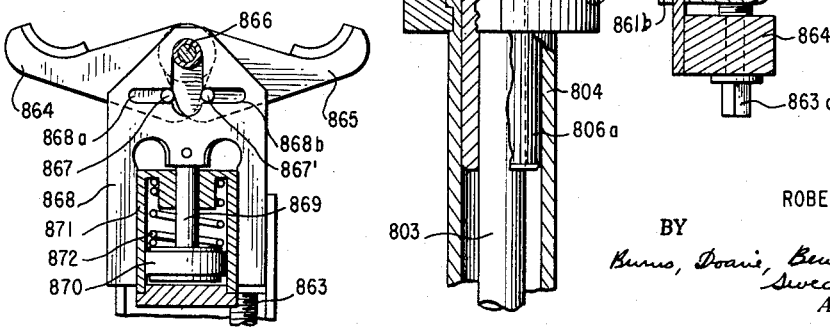

FIGURE 5 schematically represents a view of the article in position I of FIGURE 2, with the article being viewed from the right as shown in FIGURE 2;

FIGURE 6 schematically represents a view of the article in position VI of FIGURE 2, with the article being viewed from the right as shown in FIGURE 2;

FIGURE 7 schematically represents an article in position III of FIGURE 2, with the article being viewed from the right as shown in FIGURE 2;

FIGURE 8 is a side, elevational view of a schematically represented, preferred embodiment of an indicia forming apparatus including silk screen printing components;

FIGURE 9 is an enlarged, fragmentary and top plan view of a portion of the FIGURE 8 apparatus as viewed along the line 9—9;

FIGURE 10 is a fragmentary view of a portion of an article support means of the apparatus as viewed along the line 10—10 of FIGURE 9;

FIGURE 11 is a fragmentary view of another portion of an article support means of the apparatus as viewed along the line 11—11 of FIGURE 9;

FIGURE 12 is an enlarged, fragmentary, partially sectioned, and elevational view of the apparatus shown in FIGURE 8, as viewed in a mid-portion thereof from the right as shown in FIGURE 8;

FIGURE 13 is a fragmentary, enlarged, and partially sectioned, top plan view of a portion of the apparatus as viewed along the section line 13—13 of FIGURE 12, which illustrates details of a portion of a mechanism for effecting the vertical reciprocation of a carriage assembly which supports article carrying and article transfer components of the apparatus;

FIGURE 14 is a fragmentary, enlarged, partially sectioned, and top plan view of a right side portion of the apparatus as shown in FIGURE 9 which illustrates details of an article carrying means adjusting mechanism;

FIGURE 15 is a fragmentary, partially sectioned, enlarged, and side elevational view of another portion of the carriage elevating mechanism of the apparatus shown in FIGURE 12;

FIGURE 16 is a fragmentary, enlarged, partially sectioned, and side elevational view of the carriage elevating assembly shown in FIGURE 15, illustrating adjustments which may be made with respect to the retracted position of the apparatus carriage;

FIGURE 17 is an enlarged, fragmentary, partially sectioned, and rear elevational view of a portion of the apparatus shown in FIGURE 12, illustrating details of the article transfer means;

FIGURE 18 is a sectional view of a portion of the FIGURE 17 assembly, as viewed along the section line 18—18;

FIGURES 19 and 20 are fragmentary, partially sectioned, enlarged, and elevational views of a portion of the FIGURE 12 apparatus, which illustrate portions of a transfer means supporting and operating mechanism, with the portions of the mechanism shown in FIGURES 19 and 20 being integral as shown in FIGURE 12 but divided for purposes of illustration along the line a–a';

FIGURE 21 is a fragmentary, partially sectioned, enlarged, rear elevational view of a portion of the FIGURE 12 apparatus illustrating details of a mechanism for effecting oscillation of the transfer means of the apparatus;

FIGURE 22 is a fragmentary, partially sectioned, top plan view of a portion of the FIGURE 21 assembly;

FIGURE 23 is a fragmentary, partially sectioned, top plan view of a portion of the FIGURE 17 article transfer means assembly;

FIGURE 24 is a fragmentary, front elevational view of a portion of the FIGURE 17 assembly illustrating the manner in which the pivot axis of the transfer assembly may be selectively adjusted;

FIGURE 25 is an enlarged, partially sectioned, and fragmentary view of an article engaging, plunger assembly carried by the article carrying means of the FIGURE 8 apparatus, as viewed along the section line 25—26 of FIGURE 27, which assembly is adapted to engage one article end.

FIGURE 26 is an enlarged, partially sectioned, and fragmentary view of another article engaging, plunger assembly carried by the article carrying means of the FIGURE 8 apparatus and adapted to engage another article end, as viewed along the section line 25—26 of FIGURE 27.

Figure 28:
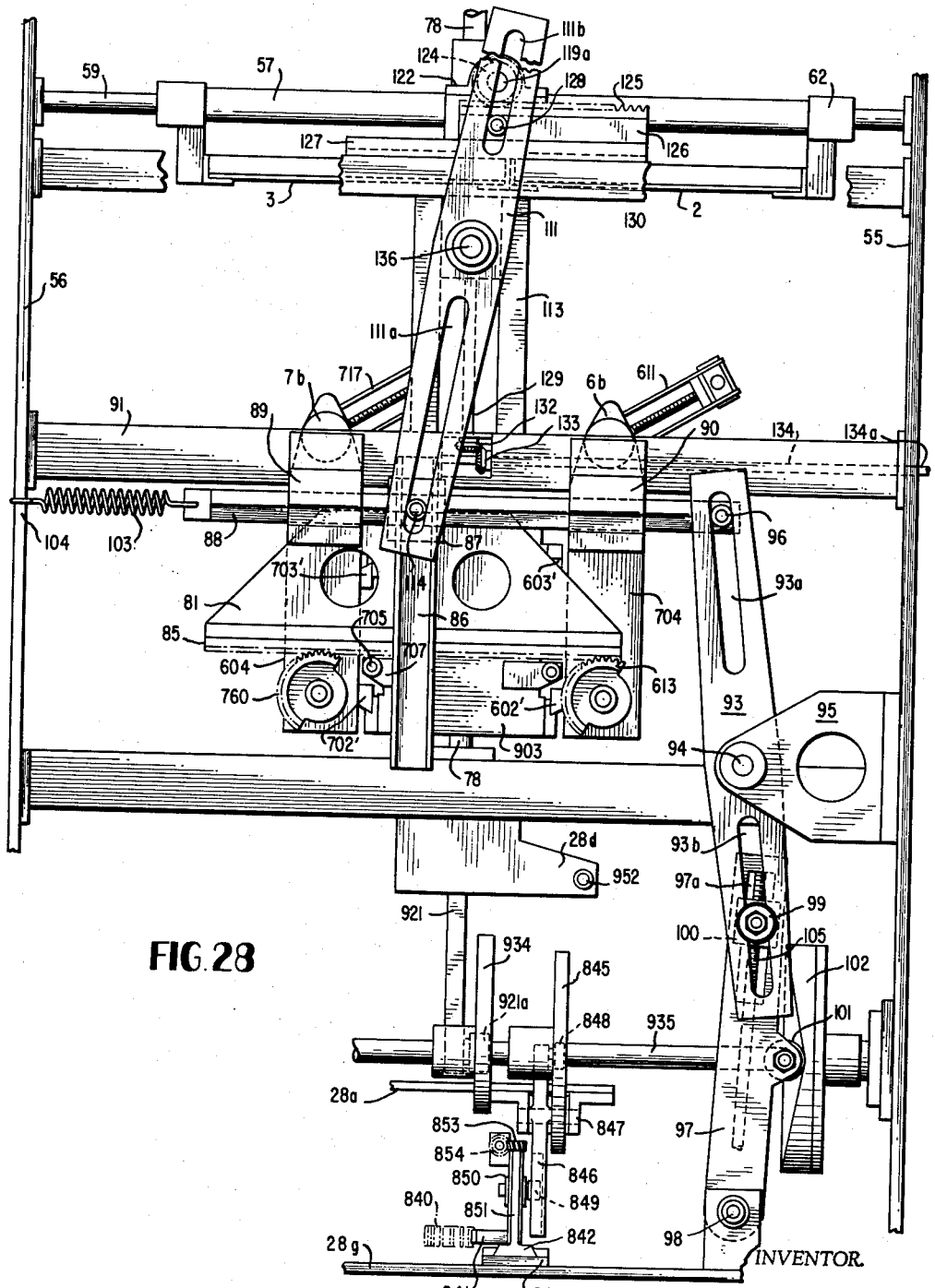

FIGURE 27 is an enlarged, fragmentary, partially sectioned, and elevational view of a portion of the FIGURE 8 apparatus as viewed from the right as shown in FIGURE 12, and illustrating details of an article carrying means of the apparatus; and FIGURE 28 is an enlarged, fragmentary, schematic, and rear elevational view of the apparatus shown in FIGURE 8, illustrating details of an indicia forming means and article carrying means, driving and adjusting mechanism.

*Indicia Forming Method*

FIGURES 1-A through 1-E schematically illustrate the manner in which this invention may be employed to effect the forming of indicia on article surfaces.

The printing mechanism schematically illustrated in FIGURES 1-A through 1-E includes reciprocable screen, indicia forming means 1. As shown, indicia forming means 1 may comprise a first, silk screen printing unit 2 and a second, silk screen printing unit 3. Silk screen units 2 and 3 are mutually spaced, coplanar, and horizontally disposed such that the edges only of the screens 2 and 3 are shown. Screens 2 and 3 are horizontally reciprocable to the right and left as shown in FIGURES 1-A through 1-E. Screens 2 and 3 are mounted together so as to horizontally reciprocate in unison.

A conventional ink distributing squeegee 4 extends transversely across the path of reciprocation of the screen 2 while a conventional ink distributing squeegee 5 extends transversely across the path of reciprocation of screen 3. Ink supplied to the screen surfaces 2 and 3 by conventional ink supply mechanisms, not illustrated, is distributed during the printing operation by the squeegees 4 and 5. As will be appreciated, the squeegees 4 and 5 may each be adapted to form multiple indicia patterns in different colors on each printed article surface by supplying ink of different colors to different squeegee zones spaced laterally across the direction of reciprocation of the screens 2 and 3. In a manner well understood in the screen printing art, squeegee 4 is positioned on the screen 2 so as to engage the screen 2 at the point where indicia is to be transferred to an article by the screen 2 while the squeegee 5 engages the screen 3 at the point where indicia is to be transferred to an article by screen 3. In a conventional fashion squeegees 4 and 5 may be retractably mounted so as to engage their associated screens 2 and 3 only during the actual indicia transferring process.

First article carrying means 6 are provided for moving articles in tangential, indicia forming contact with the screen 2. Second article carrying means 7 are provided for moving articles in tangential, indicia forming contact with the screen 3. Transfer means 8 are included for transferring an article from the article carrying means 6 to the article carrying means 7.

As shown in FIGURES 1-A through 1-E, article carrying means 6 comprises article supporting arm means to which the reference numeral 6 extends and which are pivotable about a horizontal pivot or arc axis X. Article carrying means 7 comprises article supporting arm means to which the reference numeral 7 extends and which are pivotable about a horizontal pivot or arc axis Y. Similarly, transfer means 8 comprises article supporting arm means to which the reference numeral 8 extends and which is pivotable about a pivot or arc axis Z.

As will be appreciated, with the horizontally moveable character of the screen 2, the point of engagement of the squeegee 4 and the screen 2, i.e. the indicia transfer point, will be in vertical alignment with the horizontal pivot axis X. Similarly, the point of contact between the squeegee 5 and the silk screen 3, i.e. the indicia transfer point of the screen 3, will be vertically aligned above the horizontal pivot axis Y.

Because of the structural or dimensional characteristics of the article carrying means 6, the article carrying means 7, the transfer means 8, and the articles upon which indicia are to be formed, it may be necessary during portions of the printing operation to move these components away from the silk screen assembly 1 so as to avoid interference between the arm assemblies and the silk screen printing assembly 1. It thus is contemplated that the article carrying means 6, article carrying means 7, and transfer means 8 may be mounted upon a carriage 9. Carriage 9 is mounted for vertical reciprocation toward and away from the path of horizontal reciprocation of the silk screen printing assembly 1. The pivotable arm means of transfer means 8, as illustrated, may be lowered toward the base of the carriage 9 to provide operating clearance for the component when the carriage 9 is in its elevated position.

First article conveying means are provided for transporting articles to the article carrying means 6. This article conveying means may comprise the schematically illustrated, endless conveyer 10. Conveyer 10 may be supported by means such as the schematically illustrated, sprocket wheel assembly 11 and/or by rail means in the vicinity of the article carrying means 6 and driven such that upper conveyer flight 12 moves toward the arm means 6. Articles may be supported on the endless conveyer 10 by a plurality of article supports such as the schematically illustrated support means 13.

Second article conveying means are provided for transporting articles away from the article carrying means 7. This article conveying means, as schematically illustrated in FIGURES 1-A through 1-E, may comprise an endless conveyer 14. Conveyer 14 may be supported by means such as a sprocket assembly 15 and/or rail means adjacent the article carrying arm assembly 7. The upper horizontal flight 16 of the conveyer 14 moves away from article carrying means 7 to transport articles away from the printing apparatus. Endless conveyer 14 may be provided with a plurality of article supports such as the schematically illustrated support means 17.

FIGURES 1-A through 1-E illustrate an arrangement of apparatus components adapted to the handling of articles such as a bottle or container 18 shown in end view and having a first surface 19 of substantially uniform, cylindrical curvature and a second surface 20 also of substantially uniform, cylindrical curvature. As is apparent in the FIGURE 1-A illustration, the axes of cylindrical curvature of the surfaces 19 and 20 are different. With the illustrated arrangement of apparatus components, it is contemplated that the axes of curvature of the surfaces 19 and 20 would be parallel and disposed in a plane extending perpendicular to a median plane of article symmetry passing between the surfaces 19 and 20. As shown in FIGURE 1-A, the article 18 is supported on the pivotable arm means of the article carrying means 7 such that the surface 19 faces outwardly from the axis Y and the axis of cylindrical curvature of the surface 19 coincides with the pivot axis Y.

An article 18', identical to the article 18, is supported on the pivotable arm means of the article carrying means 6. However, article 18' is supported with the surface 20', corresponding to the surface 20 of the article 18, facing generally outwardly toward the indicia forming assembly 1. A surface 19', corresponding to the surface 19 of the article 18, faces generally toward the pivot axis X. Article 18' is supported on the article carrying means 6 such that the axis of curvature of the surface 20' coincides with the pivot axis X.

Owing to the horizontally moveable character of the silk screens 2 and 3, the pivot axes X and Y are each horizontal and disposed perpendicular to the movement direction of the screens 2 and 3. The thus parallel pivot axes X and Y are also disposed in the same horizontal plane in view of the coplanar nature of the screens 2 and 3.

Viewing the apparatus as shown in FIGURES 1-A through 1-E, the transfer of indicia by the screens 2 and 3 is effected while the assembly 1 is moving to the right.

In FIGURE 1-A, the article 18' is shown at the point where it is transferred from the infeed conveyer 10 to the arm means of the article carrying means 6. The article 18' is carried on the support means 13 so that, when the article 18' is received by the article carrying means 6, the surface 20' to be first printed by the screen 2 faces generally toward the screen 2 and the axis of curvature of the surface 20' is aligned with the pivot axis X. As is also shown in FIGURE 1–A, the article 18 is being positioned upon the arm means of the article carrying means 7 by the arm means of the transfer means 8 in a manner to be hereinafter described.

As noted, FIGURE 1–A illustrates the apparatus components disposed with the article carrying means 6 having initially received the article 18 and the article carrying means 7 having initially received the article 18'. In order to insure proper clearance between the indicia forming assembly 1 and the arm means of article carrying means 6, the article carrying means 7, and the transfer means 8, the carriage 9 was retracted while the arm means of article carrying means 6 and 7 moved counterclockwise, and the arm means of the transfer means 8 move clockwise, to their respective positions illustrated in FIGURE 1–A. After articles 18' and 18 are received on the article carrying means 6 and 7 respectively, the carriage 9 is elevated such that the distance from the pivot axis X to the silk screen 2 substantially coincides with the distance between the pivot axis X and the surface 20' to be printed. With the carriage in this elevated position, the distance between the pivot axis Y and the silk screen 3 substantially coincides with the distance between the pivot axis Y and the surface 19 to be printed.

FIGURE 1–B illustrates the carriage 9 in its elevated position with the arm means of the article carrying means 6 and 7 moving in unison and parallel in a clockwise direction and the screens 2 and 3 moving horizontally rightward in unison so as to concurrently form indicia upon the surfaces 20' and 19. As shown in FIGURE 1–B, the surface 20' will move through a cylindrical path substantially coplanar with itself and tangential with the screen 2 at the point of contact of this screen with the squeegee 4. In this manner, tangential, indicia forming contact occurs between the surface 20' and the screen 2. As will be appreciated, the velocity of movement of the arm means of article carrying means 6 and the screen 2 are coordinated to insure that the surface 20' and the silk screen 2, at their point of tangential contact, are moving at the same linear velocity so that conventional screen printing may take place.

Similarly, indicia is formed on the surface 19 of the article 18 as a result of the tangential indicia forming contact which occurs between the surface 19 and the undersurface of the screen 3 at the point of contact of the squeegee 5 with the screen 3. As will be appreciated, as the arm means of the article carrying means 7 pivots clockwise, as shown in FIGURE 1–B, the article surface 19 moves through a cylindrical path substantially coplanar with itself. Screen 3 is moved to the right as shown in FIGURE 1–B at a rate coordinated with the rate of clockwise pivotal movement of the arm means of article carrying means 7 such that the screen 3 and article surface 19, at their point of tangential contact, move at the same linear velocity, so that conventional silk screen printing may occur.

As will be appreciated, screens 2 and 3 are mounted in unitary assembly and the arm means of article carrying means 6 and 7 move in unison and parallel relationship, such that indicia are simultaneously formed on surfaces 19 and 20' of articles 18 and 18' respectively.

During the clockwise movement of the arm means of article carrying means 6 and 7, the arm means of transfer means 8 pivots counterclockwise to assume the position shown in FIGURE 1–C.

During this counterclockwise movement of the transfer arm means 8, it may be lowered on the carriage 9 as shown, so as to prevent the outer extremity of this arm means from engaging or otherwise interfering with the indicia forming assembly 1. As will be appreciated, such lowering of the transfer arm means may be avoided where the diminishing of the apparatus components so permits.

As shown in FIGURE 1–C, the arm means of article carrying means 6 and article carrying means 7 are at the extremity of their clockwise pivotal movements while the arm means of transfer means 8 is at the extremity of its counterclockwise movement. In these extremity positions, the arm means of the article carrying means 6 and the transfer means 8 are so positioned as to allow the article 18' which has been printed on the surface 20' to be received by the arm means of the transfer means 8, which is elevated to its normal or transfer position. With the arm means of the article carrying means 6 and transfer means 8 being disposed in the transfer position shown in FIGURE 1–C, the pivot axis Z is defined by the intersection of a vertical plane disposed between and equidistant from the pivot axes X and Y with a plane passing between the article surfaces 20' and 19' and symmetrically disposed in relation to the axes of curvature of these two surfaces.

In the FIGURE 1–C position of the apparatus, the arm means of the article carrying means 7 is disposed at the extremity of its clockwise pivotal movement and positions an article 18 for appropriate reception by article support means 17 carried by the outfeed conveyer 14. As shown in FIGURE 1–C, after the printing of the surfaces 20' and 19 was completed, the carriage 9 was withdrawn downwardly. This withdrawal lowered the article 18 carried by the article carrying means 7 so as to allow the article 18 to be conveniently received by the support means 17 for transfer away from the printing apparatus.

FIGURE 1–D illustrates return, or counterclockwise pivotal movements of the arm means of the article carrying means 6 and 7 while the carriage 9 is in its down position. While the arm means of the article carrying means 6 and 7 move counterclockwise through their return strokes, the arm means of the transfer means 8 moves clockwise to effect the transfer of the article 18' to the arm means of the article carrying means 7. At the same time, the indicia forming assembly 1 is moved to the left, as shown in FIGURE 1–D, so as to return the screens 2 and 3 to their initial positions.

FIGURE 1–E illustrates the apparatus components when the arm means of the article carrying means 6 and 7 have moved to the extreme limits of their counterclockwise strokes and the arm means of the transfer means 8 has moved to the extreme limits of its clockwise stroke. With this disposition of apparatus components, the article 18' carried by the transfer means 8 is positioned so as to be received by the article carrying means 7. As a result of the clockwise movement of the arm means of transfer means 8, the article 18' is positioned on the arm means of the article carrying means 7 with the as yet unprinted surface 19' facing outwardly and generally toward the indicia forming assembly 1. With the article at this transfer position shown in FIGURE 1–E, it will be appreciated that the transfer pivot axis Z is again defined by the intersection of a vertical plane disposed between and equidistant from the pivot axes X and Y with a plane extending between the surfaces 19' and 20' and symmetrically disposed with respect to the curvature axes of these surfaces.

In the FIGURE 1–E position, the arm means of the article carrying means 6 is disposed to receive an article 18'' appropriately supported by a support means 21 carried by the infeed conveyer 10. Article 18'' is supported with a surface 20'' facing outwardly away from the pivot axis X and toward the indicia forming means 1. Surface 20'' corresponds to the surface 20' of the article 18' and the surface 20 of article 18. The surface 20" is supported such that its axes of cylindrical curvature substantially coincides with the pivot axis X when the carriage 9 is in its lowered position.

With the apparatus disposed as shown in FIGURE 1-E, the carriage 9 may be elevated to restore the components to the FIGURE 1-B position and the arm means of the article carrying means 6 and 7 rotated clockwise so as to effect the forming of indicia on the surfaces 20" and 19' by the silk screens 2 and 3, respectively.

The manner in which indicia are formed on two separate faces of an article has been fully described with reference to the article 18'. As will be appreciated, by repeating the cycle illustrated in FIGURES 1-A through 1-E, continuous and automatic forming of indicia on opposite sides of sequentially fed articles may be effected.

As will be appreciated, the movements of infeed conveyer 10 and outfeed conveyer 14 must be appropriately coordinated with the operation of the article carrying means 6 and 7 and the carriage 9 to effect the proper alignment of articles for transfer from the infeed conveyer 10 to the article carrying means 6 and the transfer of articles from the article carrying means 7 to the outfeed conveyer 14. As will be further appreciated, either intermittent or continuous operation of the conveyers 10 and 14 may be utilized so long as the conveyer movements are appropriately coordinated with the operation of other apparatus components. Such coordination may be readily effected by conventional drive and control mechanisms in a manner well understood in the art.

Similarly, it will be appreciated that the elevation and lowering of the carriage 9 should be effected at such times as to avoid interference with the printing operation shown in FIGURE 1-B, and to avoid interference between apparatus components during the various described movements.

However, as is apparent, the timing of the vertical reciprocation of the carriage 9 may be varied substantially in relation to the pivotal movements of the arm means of the article carrying means 6 and 7 while meeting these criteria.

As will be further appreciated, the lowering and raising of the arm means of the transfer means 8, if necessary to avoid interference with the assembly 1, must be effected in such a manner as to avoid interference with the transfer of articles from the article carrying means 6 to the transfer means 8 and from the transfer means 8 to the article carrying means 7. However, the timing of the lowering and raising of the arm means 8 may be varied considerably without adversely affecting the transfer operations while still effectively preventing interference with the screen carrying assembly 1.

In summarizing the manner in which an article such as the article 18' is manipulated while forming indicia on each of its two cylindrically curved surfaces 19' and 20', it should be noted that the described indicia forming method entails moving each article through a first arc, i.e. about the pivot axis X, while forming indicia on a first surface 20' and moving the article through a second arc, i.e. about the pivot axis Y, while forming indicia on the second article face 19'. In the highly advantageous and preferred article transfer technique illustrated in FIGURES 1-A through 1-E, each article is also moved through a third arc, i.e. about the pivot axis Z, between the first and second arc, so as to move the article which has been printed on its first face 20' into a transfer position on the second article carrying means 7 where the second surface 19' is aligned to traverse the aforenoted second arc such that the surface 19' moves through a cylindrical path substantially coplanar with itself.

In the preferred arrangement illustrated for use in conjunction with symmetrical articles, it is desirable for articles to be moved on the article carrying means 6 through an arc which is symmetrically bisected by a vertical plane extending through the pivot axis X and the point of contact of the squeegee 4 with the silk screen 2. With the arm means of the article carrying means 7 moving in unison and in parallel relationship with the arm means of the article carrying means 6, article carried by the article carrying means 7 would be moved through an arc symmetrically bisected by a vertical plane extending through the point of printing contact of the silk screen 3 and the pivot axis Y. The article is moved on the arm means of the transfer means 8 through an arc symmetrically bisected by a vertical plane passing through the pivot axis Z.

Figure 3:
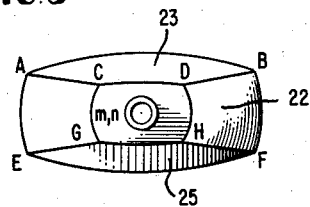
FIGURE 3 is a top plan view of the article shown in FIGURE 2.
Figure 4:
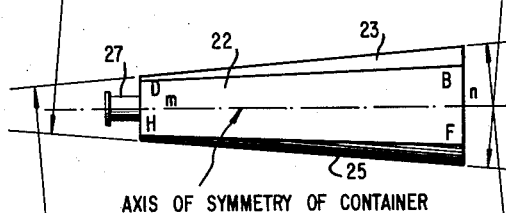
FIGURE 4 is a side elevational view of the article shown in FIGURE 3, illustrating the relationship of the axes of surface curvature.

The indicia forming technique illustrated in FIGURE 1 may be especially advantageously employed in forming indicia on the surfaces of articles such as the article 22 illustrated in FIGURES 3 and 4. Article 22 comprises a bottle including a first surface 23 which curves in uniform, cylindrical curvature about an axis 24. The article 22 includes a second surface 25 which curves in uniform cylindrical curvature about an axis 26. The article end faces ACGE and BDHF intersect the surfaces 23, 25 to define the article side faces ACDB and EGHF. Owing to the symmetrical character of the illustrated bottle type article 22, the surfaces 23 and 25 have equal radii of surface curvature and are symmetrically disposed in relation to a median plane passing between these surfaces and intersecting an article median or central axis MN. Again, because of the symmetrical character of the bottle, the median bottle axis MN and the surface curvature axes 24 and 26 are coplanar with a plane extending perpendicular to the aforesaid median plane.

For the sake of clarity, the article 22 has been illustrated in FIGURES 2, 5, 6 and 7 with the article neck 27 not shown so as to more clearly show the relative positioning of the illustrated article faces during the printing cycle.

FIGURE 5 illustrates the manner in which the article 22 is supported upon the article carrying means 6 at the initiation of tangential contact between the surface 23 and the silk screen 2. In this position, which is shown as position I in FIGURE 2, the article 22 is supported such that curvature axis 24 of the surface 23 substantially coincides with the pivot axis X of the article carrying means 6. Article carrying means 6, as shown in FIGURE 5, may comprise a pair of arm assemblies 6a and 6b. Arm assembly 6a has an article supporting arm mounted to pivot about axis X, the radial axis of which arm is schematically illustrated in FIGURE 5 and to which the assembly reference numeral 6a is directed. Similarly, arm assembly 6b has an article supporting arm also mounted to pivot about axis X, the radial axis of which arm is schematically illustrated in FIGURE 5 and to which the reference numeral 6b is directed. The arms of assemblies 6a and 6b are horizontally spaced along the axis X so as to support opposite ends of the article 22 with the curvature axis 24 of the surface 23 aligned with the axis X. In order to avoid obscuring the positional illustration of the article 22, the precise manner in which the article 22 is connected at opposite ends with the arms of assemblies 6a and 6b to be supported thereby is not shown in FIGURES 2 and 5. However, the mode of engagement between an article and the article carrying arm assemblies will be hereinafter described in detail.

With the article 22 disposed as shown in FIGURE 5 and position I of FIGURE 2, its median or center axis MN is coplanar with the pivot axis X but inclined with respect to this axis. As shown in position I of FIGURE 2, the article surface 23 is disposed with its leading point B in tangential contact with the point B' of the silk screen 2. As the screen 2 and article 22 are moved tangentially together, as a result of the rightward movement of the screen 2 and the clockwise pivotal movement of the article 22 about the axis X, the transfer of indicia will take place from the screen 2 to the surface 23 at the point where the squeegee 4 contacts the screen 2. The entire surface 23 may be moved in tangential indicia forming contact with the screen 2 if desired. As will be appreciated, indicia may be formed during any selected portion of the period while the surface 23 and the screen 2 are in tangential engagement and moving together.

After the surface 23 has traversed the extent of its tangential engagement with the screen 2 so as to bring the trailing point A of surface 23 into engagement with screen point A′, the bottle 22 will assume the position II shown in FIGURE 2, and will have had indicia formed on the surface 23 by the silk screen 2. The carriage 9 as illustrated in FIGURE 1, may then be retracted downwardly and, if desired, clockwise pivoting movement of the article 22 may be continued until the article 22 assumes the position shown in position III of FIGURE 2.

In order to effect tangential engagement between the as yet unprinted article surface 25 and the silk screen 3, it is necessary for the article 22 to be moved to a position on the article carrying means 7 so that the surface curvature axis 26 coincides with the pivot axis Y. This article transfer and reorientation is effected by moving the article 22 on the transfer means 8 about a pivot axis Z which is vertically inclined and disposed in a vertical plane lying between and equidistant from the horizontal and horizontal coplanar pivot axes X and Y. As in the case of the bottle described in connection with FIGURE 1, the pivot axis Z is defined by the intersection of a vertical plane disposed between and equidistant from the pivot axes X and Y with a plane passing between the article surfaces 23 and 25 and symmetrically disposed in relation to the curvature axes 24 and 26 when the article is disposed on the article carrying arm means 6 in position to be received by the transfer means 8. As will be appreciated, owing to the symmetrical character of the article 22, the plane of symmetry passing between the curvature axes 24 and 26 will include the median article axis MN and be perpendicular to a transverse plane extending through the pivot axes 24 and 26 and the median axis MN.

When the article 22 is pivoted by the transfer means 8 about the pivot axis Z, defined as above described, the article 22 will be traversed from the position III shown in FIGURE 2 through the intermediate position IV to assume the position V at the end of the clockwise movement of the transfer means 8. In this position V the article 22 has been reoriented from position III such that the as yet unprinted surface 25 faces outwardly away from the pivot axis Y and generally toward the screen assembly, and the curvature axis 26 coincides with the pivot axis Y. With the article 22 in this position, the pivot axis Z is again defined by the intersection of a vertical plane extending between and equidistant from the pivot axes X and Y with a plane passing symmetrically between the article surfaces 23 and 25.

The vertical inclination of the pivot axis Z is illustrated in FIGURES 7 and 2. FIGURES 2 and 7 also schematically illustrate the manner in which the transfer arm means 8 may comprise a pair of radially extending arm assemblies 8a and 8b spaced along the axis Z. In order to avoid obscuring the positional showing of the article 22, the radial arm axes only of the arm assemblies 8a and 8b have been schematically illustrated. The detailed manner in which these arms are engaged with the article, although not shown in FIGURES 2 and 7, is hereinafter described.

As will be appreciated, the article 22 when supported on the transfer means 8 in the manner heretofore described, will be disposed with the median article axis MN coplanar with the pivot axis Z but inclined with respect to this axis Z.

As is the case of the articles described in connection with FIGURE 1, the article 22 is moved in an arc about the transfer axis Z which is symmetrically bisected by a vertical plane including the pivot axis Z.

When the article 22 is positioned by transfer means 8 as shown in position V, it is received and supported by arm assemblies 7a and 7b of article carrying means 7. Arm assembly 7a has an article supporting arm mounted to pivot about axis Y, the radial axis of which arm is schematically illustrated in FIGURE 6 and to which the assembly reference numeral 7a is directed. Similarly, arm assembly 7b has an article supporting arm, also mounted to pivot about the axis Y, the radial axis of which arm is schematically illustrated in FIGURE 6 and to which the reference numeral 7b is directed. The arms of assemblies 7a and 7b are horizontally spaced along the axis Y so as to support opposite ends of the article 22 with the curvature axis 26 of the surface 25 aligned with the axis Y. As in the case of the FIGURE 5 illustration, the precise mode of engagement between the arms of the assemblies 7a and 7b and the article 22 is not shown so as to avoid obscuring the position showing of the article 22.

When the article 22 has been positioned by the arm means 8 on the article carrying means 7, the pivot axis Y may be restored to its elevated or printing position by elevating the carriage 9. With the pivot axis Y disposed in its elevated position, as shown in position VI of FIGURE 2, and with the arm means of article carrying means 7 rotated clockwise so as to effect initial tangential contact between the leading point E of the surface 25 and the point E′ of the slik screen 3, the transfer of indicia from the silk screen 3 to the surface 25 may be commenced.

FIGURE 6 illustrates the article 22 supported by the arm assemblies 7a and 7b and disposed in position VI of FIGURE 2 with the leading point E of the surface 25 in tangential contact with the point E′ of silk screen 3.

At any time while the surface 25 moves in tangential contact with the rightwardly moving silk screen 3, until it assumes the position VII shown in FIGURE 2 where the terminal point F of the surface 25 is engaged with the point F′ of the screen 3, the forming of indicia on the surface 25 may be effected. As will be appreciated, indicia may be formed on the surface 25 throughout the entire portion of tangential engagement between the pivoting article 22 and the rightwardly moving screen 3 or for any selected portion of this period of tangential engagement.

In describing the printing of surfaces 23 and 25, these surfaces have been shown as having their entire areas moved in tangential contact with screens 2 and 3. As will be appreciated, if portions only of these surfaces are to be printed, the arms of the article carrying means 6 and 7 and the carriage 9 may be manipulated so as to effect tangential contact only between surface portions to be printed and the screens 2 and 3.

*Overall Apparatus*

Principal components of the preferred embodiment of the indicia forming apparatus of this invention are schematically illustrated in FIGURE 8 in substantially greater detail than shown in the sequential operating views of FIGURES 1–A through 1–E. In showing the principal components of the apparatus in FIGURE 8, structural details pertaining to driving and adjusting mechanisms have been deleted for purposes of over-all clarity. Such details are subsequently described in connection with FIGURES 9 through 28.

The components of the FIGURE 8 apparatus are mounted upon a base framework or body 28. Framing 29 attached to the body 28 carries pivotable mounting means 30. A framework 31 is pivotably connected by the mounting means 30 to the frame portion 29 and supports the infeed, endless conveyor 10. Endless conveyer 10 may comprise a sprocket chain type conveyer mounted upon sprocket wheel assemblies such as the assemblies 32 and 33 and a tensioning, roller assembly 34, which assemblies are mounted upon the framework 31. As illustrated, rail means 35 carried by framework 31 may support an upper portion of the endless conveyer 10 so as to define the upper, horizontal conveyer flight 12 for transporting unprinted articles to indicia forming components of the apparatus. Article supports such as support means 13 and 21, previously noted, are carried by the endless conveyer 10 to support articles in appropriate positions to be received by article carrying means 6 of the apparatus.

As previously noted, in order to accommodate to particular article characteristics or apparatus component dimensions, it may be desirable to adjust the position of the conveyer 10 in the vicinity of the article carrying means 6 which receives unprinted articles. Adjustments of the elevation of the endless conveyer 10 in the vicinity of the article carrying means 6 may be effected by selectively pivoting the framework 31 about the pivot mounting 30 so as to position the upper conveyer flight 12 in a desired positional relationship with the article carrying means 6. Such pivoting of the framework 31 may be effected by a threaded rod, abutment type, adjusting mechanism comprising a threaded rod 36 which is threadably mounted in a bracket portion 37 of the framework 31 and terminates in an abutment 38 which engages the framing 29 as shown. The adjusted position of the framework 31 and thus the conveyer 10 may be secured by any conventional clamping arrangement. One such arrangement, as schematically illustrated in FIGURE 8, comprises a threaded rod 39 extending from the framework 31 and passing through an arcuate slot 40 in the framing 29. An internally threaded member 41 mounted on the threaded rod 39 may be employed to clamp the pivotable framework 31 and stationary framing 39 in the desired adjusted position.

Schematically illustrated framing 42 carried by the main apparatus frame 28 may be employed to support the endless conveyer 14 in a manner similar to that in which the framing 29 is employed to support the endless conveyer 10. As illustrated in FIGURE 8, framing 42 may carry a pivotable mounting 43 by means of which a framework 44 is pivotally mounted upon the framing 42. Framework 44 may carry a plurality of sprocket wheel assemblies including the assemblies 45 and 46 and tensioning roller means 47, by means of which a sprocket chain type of endless conveyer 14 may be mounted upon the framework 44. As shown, rail means 48, mounted on framework 44, support an upper portion of the conveyer 14 so as to define an upper, horizontal conveyer flight 16 by means of which articles which have been printed on two surfaces are transported away from the article carrying means 7.

The position of the conveyer 14 in relation to the second article carrying means 7 may be adjusted by a threaded adjusting rod 49 which is threadably mounted in a bracket portion 50 attached to the framework 44. Threaded adjusting rod 49 terminates in an abutment end 51 which engages a part of framing 42 as shown in FIGURE 8. As will be appreciated, rotation of the threaded rod 49 will vary the position of its abutment end 51 so as to effect pivotal adjustment of the framework 44 about the pivotal mounting 43 and thus adjust the position of the conveyer 14. The adjusted position of the conveyer 14 may be secured by clamping means such as a threaded rod 52 carried by the framework 44 and extending through an arcuate slot 53 in the framing 42. An internally threaded member 54 may be mounted upon the threaded rod 52 and employed to clamp the framework 44 in its adjusted position on the framing 42.

Endless conveyer 10 may comprise a pair of horizontally spaced, parallel sprocket chains 10a and 10b as shown in plane view in FIGURE 10. Each article support means such as the support means 13 may comprise two article supporting portions, each of which portions is carried by a separate conveyer chain. For example, as shown in FIGURES 10, 11 and 12, the article support 13 may comprise a first weblike component 13a projecting from the sprocket chain 10a and a second weblike component 13b projecting from the sprocket chain 10b.

Component 13a is adapted to cradle and support a portion of one end of an article such as a container neck, as shown in FIGURE 11. Support component 13b is adapted to cradle and support the other end of an article such as a bottle end as shown in FIGURE 12. Component 13b is shaped to conform to the configuration of the bottle and is oriented so as to support the article in such a position that when it is received by the article carrying means 6, a surface to be printed, such as the surface 20 of article 18, faces outwardly and when received by the transfer means 7 is disposed with its axis of curvature coinciding with the pivot axis X of the article carrying arm means 6.

As will be appreciated, however, a variety of article supports other than the structures described may be employed for supporting articles in a desired positional relationship on the infeed conveyer 10.

As shown in plan view in FIGURE 10, outfeed conveyer 14 may comprise a pair of parallel, horizontally spaced sprocket chains 14a and 14b. A variety of article supports may be utilized in conjunction with the outfeed conveyer 14 to receive printed articles from the transfer means 7. For example, two component, web type supports identical to those used on the infeed conveyer may be utilized in conjunction with the outfeed conveyer 14. Thus, as shown in FIGURES 8 and 10, an article support such as the support 17 may comprise one weblike component 17a corresponding to the component 13a of the support 13 and carried by the sprocket chain 14a. Support 17 may further include a second component such as weblike component 17b carried by and projecting from the conveyer chain 14b and configured so as to be identical to the component 13b of the support 13.

As will be apparent, the conveyers 10 and 14 may be mounted so as to be selectively elevatable, as well as inclinable; the paired conveyer chains 10a and 10b as well as the paired conveyer chains 14a and 14b may be arranged to be selectively convergeable, or separable; and the rail assemblies 35 and 48 may be mounted on frameworks 31 and 44, respectively, so as to be moveable toward or away from the article carrying means with which they are associated.

Silk screen printing assembly 1 is supported upon upwardly projecting frame portions 55 and 56 extending from base frame 28 in the manner generally illustrated in FIGURE 8. Silk screen 2 of the assembly 1 may comprise a rectangular screen printing unit, generically termed a "silk" screen, but not necessarily fabricated of silk, which unit is supported in a horizontal plane by bracket portions of a horizontally reciprocable, frame assembly 57. Silk screen 3 may comprise a rectangular screen printing unit 3 also of the so-called "silk" screen type which also is supported by a bracket portion of the frame assembly 57 so as to be coplanar with but horizontally spaced from the screen unit 2.

Frame assembly 57 may be slideably supported by means such as the rod type rails 58 and 59, as shown in FIGURES 8 and 12. Rail 58 may be telescopingly received within apertured portions 60 and 61 on one side of the frame assembly 57 while rail 59 may be received within similar apertured portions on the opposite side of the frame assembly 57. One such apertured frame portion 62 which is adapted to receive the rail 59 and which is disposed on frame assembly 57 opposite to the apertured portion 60 is illustrated in FIGURE 9.

The mechanism for effecting the reciprocation of the frame assembly 57 and thus the screen units 2 and 3 along the rails 58 and 59, although not shown in FIGURE 8, is hereinafter described.

Squeegee 4 which extends transversely across and cooperates with screen 2 to effect the printing of articles carried by the article carrying means 6 is supported by a bracket assembly 63. Assembly 63 is connected by a piston rod 64 to a pneumatically actuated piston contained within cylinder 65. Cylinder 65 may be mounted upon a horizontally extending frame portion 66 carried between the vertically extending frame positions 55 and 56. Bracket assembly 63 may include a pair of upwardly and vertically extending aligning rods 67 and 67' which pass telescopingly through guide sleeves 68 and 68' respectively, which are mounted upon the frame portion 66. Aligning rods 67 and 67' may be connected by a transversely extending abutment plate 69 positioned above the cylinder 65.

Aligning rods 67 and 67' are telescopingly received within the guide sleeves 68 and 68' so as to allow for vertical reciprocation of the bracket assembly 63 but insure and maintain the desired alignment of the bracket assembly 63 and thus also the squeegee 4 in relation to the screen 2.

When screen unit 2 moves rightward, as shown in FIGURE 8, to effect a transfer of indicia, piston rod 64 is extended in a conventional and well understood fashion to cause the squeegee 4 to engage the silk screen 2. The extended or operative position of the squeegee 4 may be positively determined by the position of the abutment plate 69 which can serve to limit the downward movement of the piston rod 64 and thus the squeegee 4.

On the return or nonprinting stroke of the screen 2, i.e. while the screen 2 moves to the left, as shown in FIGURE 8, the piston rod 64 may be retracted within the cylinder 65 so as to move the squeegee 4 vertically upwardly out of engagement with the screen 2. The extension and retraction of the squeegee 4 in relation to the screen 2 may be governed by conventional control mechanisms associated with means for introducing actuating air into the cylinder 65.

The squeegee 5 which extends transversely across the direction of reciprocation of the silk screen 3 is carried by a bracket assembly 70. Bracket assembly 70 may be connected by a piston rod 71 to a pneumatically actuated piston within a cylinder 72. Cylinder 72, like the cylinder 65, may be mounted upon the frame portion 66.

Aligning rods 73 and 73' may extend vertically upwardly from the bracket assembly 70 to pass, respectively, through guide sleeves 74 and 74' which are mounted upon the frame portion 66. The upper ends of aligning rods 73 and 73' may be connected by an abutment plate 75 which is positioned above the upper end of the cylinder 72.

Aligning rods 73 and 73' are telescopingly mounted within the guide sleeves 74 and 74' so as to allow for vertical reciprocation of bracket assembly 70 but to insure and maintain alignments of the assembly 70 and thus the alignments of squeegee 5. Abutment plate 75 may be positioned so that a mid portion 76 is adapted to engage the cylinder 72 when piston rod 71 is extended so as to regulate and determine the positioning of the squeegee 5 and thus insure proper cooperation between the squeegee 5 and the screen 3 during a printing operation. As will be appreciated, during the return, or nonprinting stroke of the screen unit 3, i.e. when the screen 3 is moving to the left as shown in FIGURE 8, the piston rod 71 may be moved upwardly onto the cylinder 72 so as to retract the squeegee 5 out of engagement with the screen 3. Conventional control mechanisms well understood in the art may be employed to effect the extension and retraction of squeegee 5 in timed relation with the reciprocation of the screen 3.

In describing the screen frame assembly 1 and the ink distributing squeegees 4 and 5, no reference has been made to the mechanisms by means of which ink is supplied to the silk screen units 2 and 3. In this connection, it will be understood that conventional, commercially available ink supply mechanisms may be employed for this purpose.

A mechanism in the preferred embodiment of the apparatus for moving articles in indicia forming contact with the screen units 2 and 3 comprises, as heretofore described in connection with FIGURES 1–A through 1–E, first, article carrying means 6 having arm means pivotable about a pivot axis X and which are adapted to receive unprinted articles from the infeed conveyer 10. The article handling mechanism further includes second, article carrying means 7 having arm means pivotable about a pivot axis Y which are adapted to transfer articles which have been printed on two surfaces to the outfeed conveyer 14.

As previously noted, article carrying means 6 is adapted to move articles through a first arcuate path so as to bring one surface of each article into indicia forming contact with the screen unit 2. Article carrying means 7 is adapted to move articles through a second arcuate path so as to bring another surface of each article into indicia forming contact with the screen unit 3.

Transfer means 8 is disposed between the article carrying means 6 and 7, as shown in FIGURE 8, and is employed to effect the transfer of articles between the article carrying means 6 and 7 in the general manner heretofore described.

As shown in the FIGURE 9 plan view of the carriage 9, and as noted in connection with FIGURE 2, the article carrying arm means 6 may include an arm assembly 6a adapted to support one article end and an arm assembly 6b adapted to support an opposite article end. Thus, as shown in FIGURE 9, the arm assembly 6a engages the neck end of the bottle type article shown in phantom line. As is also shown in FIGURE 9, the arm assembly 6b is disposed so as to engage the base end of the bottle type article shown in phantom line.

As previously noted in connection with the article carrying means 7, this apparatus component may include a first arm assembly 7a adapted to support one article end such as the neck end of a bottle shown in phantom line in FIGURE 9. Article carrying arm means 7 may further comprise a second arm assembly 7b adapted to support another article end such as the base end of the bottle shown in phantom line in FIGURE 9.

Article carrying means 6 is substantially identical to article carrying means 7. Thus, arm assembly 6a corresponds to arm assembly 7a, and the pivotable arm means of these assemblies are disposed in parallel relationship and are adapted to move in unison. Similarly, arm assembly 6b corresponds to arm assembly 7b and the pivotable arm means of these assemblies are parallel and move in unison.

Arm assembly 6a and arm assembly 6b cooperate to effect the swinging of an article about their common pivot axis X. Similarly, arm assembly 7a and arm assembly 7b cooperate to effect the pivoting of an article about their common pivot axis Y.

In the manner before noted, transfer means 8 may comprise a first arm assembly 8a and a second arm assembly 8b as shown in FIGURES 9 and 12. Arm assemblies 8a and 8b are mounted upon and spaced along a support shaft which is adapted to pivot about the transfer axis Z. In a manner to be hereinafter described, the transfer arm assembly 8a is adapted to engage an article carried by the article carrying means 6 at a location disposed inwardly of the point of engagement between the article and the arm assembly 6a. As will also be hereinafter described, the transfer arm assembly 8b carries a vacuum cup type, article engaging device adapted to engage an article edge between the surfaces which receive indicia.

In order that the apparatus may accommodate articles of different axial lengths, the arm assemblies 6b and 6a are mounted on the carriage 9 so as to be selectively convergeable or separable. The arm assemblies 7a and 7b are similarly mounted upon the carriage 9 for selective convergence or separation. Transfer arm assemblies 8a and 8b are also mounted upon their supporting shaft so that they may be separated or converged, depending upon the length of an article being transferred. The precise mode of adjusting of the spacing of the various described arm assemblies is hereinafter described.

In order that they might accommodate to a variety of articles having different surface curvatures, the arm assemblies 6a and 6b, 7a and 7b and 8a and 8b are selectively extensible or contractable in character so that articles may be supported at an appropriate distance from the pivot axes X, Y and Z. The manner in which the length of these arm assemblies are adjusted for this purpose is hereinafter described.

In order to facilitate access to apparatus components and to prevent inadvertent engagement between the article carrying and article transfer components of the apparatus while they are in motion, it may be desirable, as previously noted, to mount the article carrying means 6, the article carrying means 7 and the transfer means 8 upon a vertically reciprocable, carriage 9. The manner in which carriage 9 is elevated and lowered in timed coordination with the operation of the over-all apparatus is hereinafter described.

Carriage 9 is prevented from turning about its axis of elevation by guide means such as vertically extending guide rods 77 and 78 which are mounted upon the apparatus base frame 28 and which are secured at their upper end to frame portions such as the frame portion 66 as illustrated in FIGURE 8. As shown in FIGURES 9 and 12, guide rod 77 is telescopingly received within a bushing 79 mounted on the carriage 9 while guide rod 78 is telescopingly received in a bushing 80 mounted on the carriage 9.

With the over-all apparatus having been described so as to demonstrate the principal components involved and their general mode of cooperation, structural details of the carriage 9, the article carrying means 6 and 7, and the transfer means 8, including a description of the drive and adjusting mechanisms incorporated within each component will now be presented.

In describing each of these major components, the structural elements directly pertaining to the operation of each component will be identified by a three digit reference numeral, the first digit of which will be identical to the identifying integer involving the component concerned. Thus, structure pertaining primarily to the article carrying means 6 will be identified by reference numerals in the 600 series; structure relating mainly to the article carrying means 7 will be identified by reference numerals in the 700 series; structure involving primarily the transfer means 8 will be identified by reference numerals in the 800 series; and structure pertaining to the carriage 9 will be identified by reference numerals in the 900 series.

*Carriage Mechanism*

The manner in which the carriage 9 and the various components supported thereon are elevated toward the indicia forming assembly 1 and retracted vertically downwardly away from this assembly will be explained by reference to the illustrations of FIGURES 9, 12, 13, 15 and 16.

Carriage 9 includes a base 901. A pedestal 902 projects upwardly from one side of the base 901 to provide means for supporting the arm assemblies 6a and 7a on opposite sides in the manner generally shown in FIGURE 9. The precise mode of attachment of the arm assemblies 7a and 6a to the pedestal 902 will be subsequently described.

A pedestal 903 projects upwardly from the carriage assembly base 901 so as to provide support for the arm assemblies 6b and 7b in the manner generally shown in FIGURE 9. The manner in which the arm assemblies 6b and 7b are supported on the pedestal 903 will be hereinafter described.

An elevating shaft 904 is rigidly attached to the base 901 and extends vertically downwardly away from the base 901 as shown in FIGURE 12. As shown in FIGURES 15 and 16 elevating shaft 904 may be attached to the base 901 by means such as an upper shaft portion 904a which extends through a base aperture 901a to terminate in a threaded portion 904b on the upper surface of the base 901. A conventional, internally threaded, nut 905 may be mounted upon the threaded shaft end 904b and employed to draw the shaft upwardly until abutment means such as a shaft collar 906, rigidly mounted on the shaft 904, is brought into engagement with a lower portion of the base 901. Threaded nut 905 and abutment collar 906 thus cooperate to provide a clamp structure for rigidly securing the elevating shaft 904 to the base 901.

Elevating shaft 904 includes an externally threaded lower portion 904c which is threadably assembled with an internally threaded elevating sleeve 907. Sleeve 907 is telescopingly mounted in a housing pedestal 908 which is mounted on a frame portion 28a. A friction reducing bushing 909 may be disposed between the elevating sleeve 907 and the housing 908 as shown in FIGURES 15 and 16.

Within the lower portion of the housing 908, a gear 910 is journaled for rotation about the common axis of the elevating sleeve 907 and elevating shaft 904. Shaft means such as the illustrated square, cross-sectioned shaft 911 may be keyed to the lower end of the elevating sleeve 907 by means such as connecting pins 912. Square shaft 911 extends vertically downwardly away from the lower end of the sleeve 907 so as to pass slideably through an aperture 910a in the gear 910.

Gear 910 is meshingly engaged with a worm gear 913 as shown in FIGURE 12. Worm gear 913 may be rigidly mounted upon a shaft 914 which is journaled in frame portions 28b and 28c as shown. Shaft 914 may be connected by meshing gears 915 and 916 to an operating wheel 917.

By reference to FIGURES 9 and 15, the manner in which the previously described structural elements may be employed to adjust the retracted or lowermost position of the carriage 9 will become apparent. By rotating the operating wheel 917, the shaft 914 is rotated so as to effect the rotation of the elevating sleeve 907 through the cooperation of the worm gear 913, the gear 910, and the shaft 911. With the carriage 9 being stabilized and prevented from rotating about its elevation axis by the guide rods 77 and 78, the externally threaded elevating shaft 904, which is rigidly attached to the carriage base 901, is prevented from turning. As a result, rotation of the elevating sleeve 907 is effective to cause the shaft 904 to move either upwardly or downwardly with respect to the base frame 28 and support 908, dependent upon the direction of rotation of the operating wheel 917. In this fashion, the retracted position of the carriage 9, i.e. the position where the elevating sleeve 904 is in its lowermost position as shown in FIGURE 16, may be selectively adjusted so as to effect appropriate positional relationships between the article carrying means 6 and 7 and article supports carried by the conveyors 10 and 14.

As shown in FIGURE 15, the carriage elevating sleeve 907 includes a pair of vertically spaced, radially extending, annular flanges 907a and 907b which define an annular groove 918. A carriage elevating mechanism to be now described cooperates with the groove 918 to effect the vertical reciprocation of the carriage assembly 9.

As shown in FIGURES 12 and 13, the carriage elevating mechanism includes a first lever component 919 having a generally C or yoke shaped configuration. Lever component 919 is rigidly mounted upon a hollow shaft 920. A cam follower 921 is rigidly mounted on an intermediate portion of the hollow shaft 920 as shown in FIGURE 13, so as to be rigidly connected with the yokelike, lever component 919. Hollow shaft 920 is journaled for rotation in means such as bushings 922 and 923 carried, respectively, by brackets 924 and 925 which extend from and are connected to the frame portion 28d as shown in FIGURE 13.

Lever component 919 includes a first arm 919a which extends generally radially away from the hollow shaft 920.

Lever component 919 further includes a second arm 919b, spaced from the first arm 919a, as shown in FIGURE 13, which also extends radially away from the hollow shaft 920. First arm 919a is provided with a radially extending slot 919c the function of which will be hereinafter described. Second lever arm 919b includes a slot 919d which extends radially away from the hollow pivot shaft 920 and is disposed so as to be parallel to the slot 919c. The function of slots 919c and 919d will be shortly described.

A second, generally rectangularly shaped lever component 926 is pivotally mounted upon a pivot shaft 927, shown in dotted lines in FIGURE 13, which shaft is secured to frame portion 28e by downwardly depending brackets 928 and 929 as shown in FIGURES 12 and 13.

Rectangular lever component 926 extends generally between the arms 919a and 919b of the yokelike lever component 919 as shown in FIGURE 13. Lever component 926 includes a pair of parallel, horizontally spaced arms 926a and 926b which extend generally radially away from the pivot shaft 927. Arms 926a and 926b are apertured and may be connected by a tubular spacer 926c to provide means for joining and pivotably mounting the lever components 926a and 926b upon the shaft 927. The outer or freely swinging ends of the lever arms 926a and 926b may be connected by a horizontally extending, spacer member 926d, as illustrated in FIGURE 13.

Lever arm 926a includes an outwardly facing groove 926e which extends radially of the pivot shaft 927 along the length of the lever arm 926a. Similarly, lever arm 926b is provided with an outwardly facing groove 926f which extends radially away from the pivot shaft 927 and longitudinally along the lever arm 926b. Groove 926f is disposed so as to be parallel to the groove 926e.

Lever component 919 and lever component 926 are connected by assemblies 930 and 931. Assembly 930 comprises a mounting block 930a carried in the slot 919d of the lever arm 919b. A roller 930b is mounted upon the block 930a so as to project into the groove 926f of the arm 926b. Similarly, the assembly 931 comprises a mounting block 931a carried in the slot 919c of the lever arm 919a. A roller 931b is carried by the block 931a and projects into the groove 926e of the lever arm 926a.

The lever component 926 is connected to the shaft elevating sleeve 907 by connecting studs 932 and 933, as shown in FIGURES 12, 13, 15 and 16. As shown in FIGURE 13, connecting stud 932 is mounted upon the freely swinging end of the lever arm 926b and projects into one side of the annular groove 918 of the elevating shaft 907. The connecting stud 933 is attached to the freely swinging end of the lever arm 926a and projects into a side of the groove 907 opposite to that into which the connecting stud 932 projects.

The follower assembly 921, which is rigidly connected with the lever arms 919a and 919b, includes a roller type follower 921a which is adapted to engage the camming edge of a rotatable carriage elevating cam 934 the profile of which is schematically illustrated in FIGURE 12. Carriage elevating cam 934 is keyed to and mounted upon a drive shaft 935 which comprises the main drive shaft for the apparatus. This shaft may be rotated by a conventional, commercially available drive mechanism, not illustrated.

The camming edge of cam 934 is appropriately configured in a well understood fashion to effect the desired mode of oscillation of the follower assembly 921 which, through means of the cooperating lever components 919 and 926 will effect reciprocation of the carriage 9 in coordination with the operation of the over-all apparatus. Continuous engagement between the roller component 921a of the follower 921 and the camming edge of the cam 934 may be effected by means of a lever biasing, coil spring 936 which, as illustrated in FIGURE 12, biases the freely swinging end of the lever component 926 downwardly. This downward biasing of the lever component 926, by means of the assemblies 930 and 931, will be transferred to the lever component 919 so as to bias the follower 921 counterclockwise as shown in FIGURE 12, and thus bias the follower roller 921a into continuous engagement with the cam 924. Biasing spring 936 may be connected at one end to a bracket 937 on the freely swinging end of the lever component 926 and attached at an opposite end to the base portion 28a as shown in FIGURE 12. With the cam 934 and the follower assembly 921 disposed as shown in FIGURE 12, the lever component 919 will assume its lowermost pivoted position as there shown. Accordingly, the lever component 926, which is interconnected with the lever component 919 through the roller 930b slideably positioned in the groove 926f and the roller 931b slideably positioned in the groove 926e, the lever component 926, will also assume its lowermost position. With this lowermost lever position, the carriage elevating sleeve 907 will assume its lowermost or retracted position as shown in FIGURE 16. In this position, the sleeve flange 907d may abuttingly engage a resilient, shock absorbing, bushing 938 carried at the upper end of the housing 908 as shown in FIGURES 15 and 16.

As the cam 934 is rotated, the follower assembly 921 is caused to be pivoted clockwise, as shown in FIGURE 12, so as to cause the lever component 919 to assume its uppermost pivoted position. As the lever 919 is pivoted upwardly, the lever component 926 will also be pivoted upwardly about its pivot shaft 927 because of the lever component connecting assemblies 930 and 931. As the lever component 926 pivots upwardly, the connecting studs 932 and 933 engage the sleeve flange 907a so as to elevate the sleeve 907 and thus the carriage 9. As will be appreciated, the sleeves 907a and 907b, engaged by the connecting studs 932 and 933, are of sufficient width to accommodate for the lateral movement of the connecting studs 932 and 933 while the lever component 926 is being pivoted.

As shown in FIGURE 12, the cam 934 includes a portion 934a of uniform, cylindrical curvature so that, after the carriage assembly has been elevated to its uppermost position, it will be held in this position for a sufficient increment to allow for the forming of indica on articles carried by the article carrying means 6 and 7 in the manner previously described.

In order to accommodate to particular article or apparatus component dimensions, it may be desirable to vary the elevated or uppermost postion of the carriage 9 without changing its retracted position. Such changes in the elevated position of the carriage 9 require modifications in the extent of reciprocation of the carriage 9. These changes may be effected by adjusting the positions of the connecting assemblies 930 and 931 so as to effectively change the length of the lever arms 919a and 919b. As will be appreciated, such changes in lever arm length will effect corresponding changes in the degree of reciprocation of the carriage assembly 9.

The manner in which the positions of the connecting assemblies 930 and 931 may be adjusted is illustrated in FIGURES 12 and 13.

Connecting block 931a of connecting assembly 931 is slideably mounted in a slot 919c which extends longitudinally along the lever arm 919a as shown in FIGURES 12 and 13. A threaded rod 939 is mounted upon brackets 940 and 941 which extend laterally outwardly from the lever arm 919a. Threaded rod 939 is threadably engaged with an internally threaded aperture of the block 931a. As shown in FIGURE 12, the threaded rod 939 may be provided at one end with the helical gear 942 which is meshingly engaged with a helical gear 943 carried on an end 944 of shaft 945. As shown in FIGURE 13, shaft 945 is rotatably journaled within the hollow pivot shaft 920. On the end of the journaled shaft 945 opposite to that carrying the helical gear 944 there is mounted another helical gear 946. Helical gear 946 is meshingly engaged with a helical gear, not illustrated but identical to the illustrated gear 942, which is mounted on a threaded rod 947. Threaded rod 947 is journaled on brackets 948 and 949 so as to be spaced outwardly from and carried by the lever arm 919b. Threaded rod 947 is threadably engaged with an internally threaded aperture in the block 930a.

One end of the journaled shaft 945 may carry a bevel gear 950 adapted to meshingly engage a bevel gear 951 mounted upon an adjusting shaft 952. Adjusting shaft 952 is journaled in frame portions 28d and 28f as shown in FIGURES 12 and 13. Adjusting shaft 952 may be provided with an operating wheel 953 illustrated in FIGURES 12 and 13. The shaft 952 may be biased to the left as shown in FIGURE 13 by a coil spring 954 disposed between the housing portion 28d and the bevel gear 951 so as to tend to bias the gear 951 out of meshing engagement with the gear 950.

When the operating wheel 953 is pressed inwardly and thus moved to the right as shown in FIGURE 13, so as to overcome the biasing effect of the coil spring 954, the gear 951 is brought into meshing engagement with the gear 950. The journaled shaft 954 may then be rotated by rotating the wheel 953 so as to cause rotation of the threaded rods 939 and 947 through the cooperating action of the described helical gears. This rotation of the threaded rods 939 and 947, as induced by rotation of the adjusting wheel 953, will be effective to cause simultaneous movement of the aligned connecting assemblies 930 and 931 along the longitudinal axes of the lever arms 919b and 919a so as to effectively change the length of these lever arms in relation to their connections with the lever component 926. In this fashion, the extent of vertical reciprocation of the carriage 9 may be easily accomplished.

With the cam 934 in operation so as to effect the reciprocation of the carriage 9, it will be appreciated that the journaled shaft 945 will oscillate to some extent about its own axis. However, in practice it has been found that this oscillation is of such a character such that the adjusting wheel 953 may be operated so as to effect adjustments in the position of the connecting assemblies 930 and 931 even while the cam 934 is in operation. As will be appreciated, while adjustments are not being made, the coil spring 954 will break the meshing engagement between the journaled shaft 945 and the adjusting shaft 952 so as to prevent oscillation of the wheel 953 caused by oscillation of the shaft 945.

As will be appreciated, when the carriage is in its upper position and the follower roller 921a is engaged with the uniformly curved portion 934a of the cam 934, the journaled shaft 945 will remain stationary such that manipulations of the adjusting wheel 953 may be most conveniently made at this point without the necessity of over-riding any wheel movement induced by movement of the journaled shaft 945.

Transfer Arm Means

The over-all structure of the transfer means 8 is illustrated in FIGURES 12 and 17. As there shown, this apparatus component comprises the previously mentioned arm assemblies 8a and 8b, both of which are mounted upon a pivot shaft 801 which is adapted to oscillate about the transfer axis Z.

At a location intermediate arm assembly 8a and arm assembly 8b, a planetary gearing assembly 802 is mounted upon the shaft 801 to serve as a driving connection between the pivot shaft 801 and an oscillatable drive shaft 803. Drive shaft 803 extends vertically downwardly away from the planetary gearing assembly 802 and passes coaxially through a transfer means elevating sleeve 804. Drive shaft 803 is journaled for rotation within the sleeve 804 by means such as the schematically illustrated, bearing assembly 805.

As shown in FIGURES 17, 20 and 23, planetary gearing assembly 802 comprises a yoke type housing component 806 having a downwardly extending bushing portion 806a telescopingly received within the sleeve 804 and disposed between the sleeve 804 and the shaft 803. As illustrated, the yokelike housing component 806 may be employed to support the bearing assembly 805. An abutment type collar 807 rigidly attached to the upper end of the sleeve 804 may provide a convenient mechanism for rigidly attaching the housing component 806 to the sleeve 804. The collar 807 and the base of the housing component 806 may be joined, for example, by conventional, threaded fastening means, not shown.

Housing component 806 includes a pair of leglike extensions 806b and 806c which project upwardly away from the base of the housing component 806 to extend on opposite sides of the pivot shaft 801 as shown in FIGURES 20 and 23.

A second, caplike housing component 808 is mounted upon the pivot shaft 801 by means such as the schematically illustrated, conventional bearing assemblies 809 and 810. The open end of the housing component 808 faces downwardly and is positioned over the upwardly extending leg components 806b and 806c. Housing component 808 is adapted to pivot in a vertical plane extending between, equidistant from and parallel to the pivot axes X and Y by connecting means such as the stub axle 811 and axle assembly 812 as shown in FIGURES 20 and 23. Stub axle 811 extends between one side of the housing component 808 and the leg 806c while the axle assembly 812 extends in coaxial alignment with the stub axle 811 between the other side of the housing component 808 and the leg 806b. As shown in FIGURES 20 and 23, the connecting stub axle 811 is threadably mounted in an aperture 806d of the leg 806c and extends freely through an aperture 808a of the housing component 808. Axle assembly 812 may be rotatably journaled in an opening 808b of the housing component 808 and extend rotatably through an aperture 806e in the leg 806b.

Planetary gearing assembly 802 is contained within the pivotally interconnected, housing components 806 and 808 as illustrated in FIGURES 17, 20 and 23. Planetary gearing assembly 802 comprises an upwardly facing bevel gear 813 rigidly carried on the upper end of the drive shaft 803, a second bevel gear 814 rotatably mounted upon an axle portion 812a of the axle assembly 812 so as to be facing rearwardly as shown in FIGURE 17, and a third bevel gear 815 rigidly mounted on the pivot shaft 801 and facing to the right as shown in FIGURE 17. As illustrated in FIGURE 17, the first bevel gear 813 is meshingly engaged with the second bevel gear 814 in a planetary fashion, while the second bevel gear 814 is meshingly engaged with the third bevel gear 815 so as to enable oscillation of the shaft 803 to effect oscillation of the pivot shaft 801.

With the disposition of gears 813, 814 and 815 as shown in FIGURES 17, 20 and 23, the housing 808 and the shaft 801 may be pivoted about the common axis of the stub axle 811 and axle assembly 812 so as to change the inclination of the pivot shaft 801 in a vertical plane, relative to the vertical drive shaft 803 without interrupting the driving connection between the shafts 801 and 803. When the shaft 801 is thus tilted, relative planetary movement between the gears 813 and 814 will occur without interrupting the meshing engagement between these gears. As will be apparent, relative pivotal movement between the shafts 801 and 803 is limited to the extent that engagement between the bevel gears 813 and 815 must be avoided.

As will be appreciated, the relative planetary movement between gears 813 and 814 may induce rotation of the shaft 801 and undesirably change the positions of arm assemblies 8a and 8b. Because of this, these assemblies may be attached to the shaft 801 by clamping means, hereinafter described, which enable the assemblies to be loosened relative to the shaft 801, rotated to their desired positions, and reclamped in this position.

A mechanism for effecting pivotal movement of the housing 808 and the pivot shaft 801 relative to the housing component 806 and the vertical drive shaft 803 is illustrated in FIGURE 24. An abutment 816 projects laterally outwardly from the outer face of the housing leg 806b. A threaded rod 817 is threadably mounted in a flange portion 808c of the housing component 808 and is disposed so as to abuttingly engage one side of the abutment 816 as shown in FIGURE 24. A second threaded abutment rod 818 is threadably mounted in a flange portion 808d of the housing component 808 and is disposed so as to abuttingly engage the side of the abutment 816 opposite to that engaged by the threaded abutment rod 817. As will be appreciated, by appropriately manipulating the abutment rods 817 and 818, the housing component 808 and its journaled pivot shaft 801 may be selectively inclined. If desired, a pointer 819 may be carried on the housing component 808 to cooperate with an inclination scale 820 carried by the housing leg 806b so as to provide a visual indication of the degree of inclination of the pivot shaft 801.

The structural elements which enable the elevation of the pivot shaft 801 to be selectively adjusted are illustrated in FIGURES 19 and 20.

The apparatus elements shown in FIGURES 19 and 20, which have been divided along the connecting line a—a' for purposes of illustration, comprise an assembly, the function of which is to enable the operative, elevational positions of the pivot shaft 801 to be selectively adjusted and to enable the sleeve 804 to be selectively lowered and raised. This lowering of the sleeve 804 effects the lowering of the transfer arm means 8 from its operative position, as described in connection with schematic illustrations 1–A through 1–E, so as to provide clearance for the arm means during its oscillating strokes.

As shown in FIGURES 19 and 20, sleeve 804 is telescopingly received within an externally threaded sleeve 821. Externally threaded sleeve 821 is threadably secured to an internally threaded, coaxial sleeve 822 which is journaled within the carriage base 901 as generally shown in FIGURE 19. Rotation of the sleeve 821 relative to the base 901 is prevented by key means 823 which intersects a longitudinally extending slot 821a on one side of the sleeve 821. Key means 823 may be mounted in a generally C-shaped bracket assembly 824 which is fastened to the carriage base 901 by means such as the illustrated threaded fastener 825.

As shown in FIGURE 19, gear 826 is coaxially and rigidly mounted upon the sleeve 822 and, as shown in FIGURE 12, is meshingly engaged with a worm gear 827. Worm gear 827 is mounted upon a rod 828 which extends to an adjusting wheel 829. As will be appreciated, rotation of the adjusting wheel 829 will effect rotation of the worm gear 827 and thus rotation of the gear 826 and the sleeve 822. Owing to the threaded interconnection between the sleeves 821 and 822 and the keying of the sleeve 821 relative to the carriage base 901, rotation of the sleeve 822 will be effective to cause extension or retraction of the sleeve 821 relative to the base 901 without rotation of the sleeve 821 taking place. This extension or retraction of the sleeve 821 will effect the elevation or lowering of the sleeve 804 and thus the pivot shaft 801 owing to a supporting relationship existing between the sleeve 821 and the sleeve 804 to be now described.

A lower end portion 821b of the sleeve 821 is secured within the upper end of a cylinder 830. Cylinder 830 is carried by the sleeve 821 below the carriage base 901 as shown in FIGURE 19. Sleeve 804 is telescopingly received within the sleeve 821 so as to extend into the cylinder 830 and be connected to a piston 831. Relative rotation between the sleeve 804 and the sleeve 821 is prevented by means such as the keys 832 and 833 which extend, respectively, into longitudinally extending slots 804a and 804b formed in the periphery of the sleeve 804. Keys 832 and 833 may be mounted upon the upper end of the cylinder 830 so as to be rigid with and intersect the sleeve 821 as shown in FIGURE 19.

Piston 831 may be biased to a downward position in engagement with the base of the cylinder 830 by a coil spring 834. Pressurized fluid such as air may be directed against the lower end of the piston 831 through a supply conduit 835.

When no fluid pressure is supplied through the conduit 835, the piston 831 will assume the position illustrated in FIGURE 19 so as to cause the sleeve 804 to be supported by and carried with the sleeve 821 by means of the interconnecting cylinder 830. Thus, with the sleeve 804 positioned in its retracted position as shown in FIGURE 19, axial movement of the sleeve 821 induced by rotation of the sleeve 822 will be effective to move and change the position of the sleeve 804 and adjust the elevation of the pivot shaft 801.

Retraction or extension of the sleeve 804 to effect the lowering or raising of the transfer arm means 8, as described in connection with the FIGURES 1–A to 1–E, to obtain a desired clearance of apparatus components may be effected by introducing pressurized fluid through the conduit 835 into the interior of the cylinder 830. Such fluid will move the piston 831 upwardly so as to extend the sleeve 804 to its fully extended or operative position, i.e., the position of the transfer means 8 at each end of the article transfer arc where the arm means of transfer means 8 cooperates with either the article carrying means 6 or the article carrying means 7 to effect an article transfer. This extended or operative position of the sleeve 804 may be positively determined by an annular abutment surface 821c formed on the lower end of the sleeve portion 821b which is adapted to limit the upward movement of the sleeve 804 by engaging the upper surface of the piston 831. When the transfer means 8 is to be retracted, as shown for example in the FIGURE 1–B, the supply of pressurized fluid to the cylinder 830 may be interrupted so as to allow the coil spring 834 to bias the piston 831 downwardly and return the sleeve 804 to the retracted position shown in FIGURE 19. Where retraction of the transfer means 8 is deemed necessary, it may be effected at any time between article transfer points so long as the desired clearance is timely accomplished. As will be appreciated, the supplying of pressurized fluid to the cylinder 830 and the interruption of the supplying of such pressurized fluid may be coordinated with the operation of the over-all apparatus by conventional control mechanisms. As will be further appreciated, in many instances the arm means may remain in its elevated position throughout the printing cycle when no clearance problem is present.

As is now apparent, with the aforedescribed mechanisms for adjusting the inclination and degree of elevation of the pivot shaft 801, and for holding the pivot shaft 801 in its operative position, the arm means of the transfer means 8 may be disposed to pivot about a variety of pivot axes Z in order to accommodate a variety of article configurations and dimensions.

The mechanism for effecting the oscillation of a pivot shaft 801 about a selected pivot axis Z is illustrated in FIGURES 12, 19, 21 and 22.

As shown in FIGURES 19 and 20, drive shaft 803 extends coaxially through the sleeve 804, piston 831, and cylinder 830 and is rotatably journaled within these components by means such as the previously noted bearing assembly 805.

A member 836 is rigidly mounted on the lower end of the drive shaft 803 as illustrated in FIGURE 19. Member 836 includes a gear portion 836a which meshingly engages a gear portion 837a of a member 837 mounted for vertical sliding movement on a square cross-sectioned shaft 838. As the sleeve 804 is moved under the influence of the piston 831, or the spring 834, so as to move the drive shaft 803 upwardly and carry with it the member 836, meshing engagement between the gear portions 836a and 837a is preserved by an annular flange portion 837b of the member 837 which is received within an annular groove 836b of the member 836. The cooperating action of the annular flange 837b and the annular groove 836b is such as to cause the member 837 to be carried with the member 836 while it is moved with the drive shaft 803.

As shown in FIGURE 12, square shaft 838 is journaled for rotation about a vertical axis by being journaled at its lower end on a frame portion 28g and by being journaled at its upper end in a bracket assembly 839 which may be mounted on the frame portion 28a as shown.

Square shaft 838 is adapted to be oscillated so as to effect the oscillation of the pivot shaft 801 through means of the interconnected drive shaft 803 and gear portions 836a and 837a by a mechanism illustrated in FIGURES 12, 21 and 22.

As shown in FIGURES 12 and 22, a gear 840 is carried on a lower end of the square shaft 838 in meshing engagement with a horizontally reciprocable, toothed rack 841. Toothed rack 841 is mounted upon a horizontally reciprocable slide assembly 842 which is slideably mounted in a trackway 843 secured to the frame portion 28g. Slide assembly 842 may be connected by a tensioning coil spring 844 to a frame portion such as portion 28b in the manner generally shown in FIGURE 21.

As shown in FIGURES 21 and 28, a cam 845 is carried on the main apparatus drive shaft 935 so as to operably engage a lever 846 pivotably mounted upon the frame portion 28a at pivot mounting 847. Pivoted lever 846 carries a roll 848 which engages the camming periphery of the cam 845 as shown in FIGURES 21 and 28. The end of the pivoted lever 846 opposite to that carrying the roller 848 is provided with a longitudinally extending groove 846a.

As shown in FIGURES 21, 22 and 28, a roller type abutment 849 is carried by a block 850 which is slideably mounted in a vertically extending slot 851a formed in a pillar 851 projecting upwardly from the base of the slide assembly 842. Block 850 extends laterally through the slot 851a and is secured upon the pillar 851 by block flange portions 850a and 850b as shown in FIGURE 22. Abutment roller 849 extends into groove 846a so as to be slideable therealong and connected with the lever 846.

With the arrangement of components described above, it will be appreciated that the coil spring 844 will be effective to bias the slide assembly 842 to the right as shown in FIGURE 21, so as to cause the abutment roller 849 to tend to pivot the lever 846 counterclockwise and thus hold the lever roller 848 in engagement with the camming edge of the cam 845. As will be appreciated, the lever 846 will function as a cam follower and will pivot in response to the configuration of the edge of cam 845 so as to oscillate and, in turn, cause oscillation of the slide 842 and the toothed rack 841. The oscillation or horizontal reciprocation of the toothed rack 841 will effect oscillation of the square shaft 838 by way of the gear 840. This oscillatory movement of the shaft 838 will be transferred to the drive shaft 803 by the intermeshed gear portions 836a and 837a so as to effect the oscillation of the pivot shaft 801 about the transfer axis Z. As will be appreciated, the camming edge of cam 845 will be appropriately configured in a well known fashion to effect the oscillation of the pivot shaft 801 of the transfer means 8 in timed relation with the operation of the article carrying means 6 and 7.

A mechanism for adjusting or altering the extent of oscillation of the square shaft 838 and thus the extent of the arc through which the arm means of the transfer means 8 is moved, is also illustrated in FIGURES 21 and 22. As there shown, a vertically extending, externally threaded rod 852 is journaled in the pillar 851 and extends through the longitudinal pillar slot 851a so as to threadably engage an internally threaded portion of the abutment 849 carrying block 850. A helical gear 853 is mounted upon the upper end of the rod 852 and meshingly engages a helical gear 854 mounted upon a horizontally rotatable shaft 855, which shaft is journaled on bracket portions 856 and 856a of the slide assembly 842. Rod 855 terminates in an operating knob 855a by means of which the shaft 855 may be rotated so as to induce rotation of the threaded rod 852 through the cooperating action of the helical gears 853 and 854. Such rotation of the rod 852 will cause vertical movement of the block 850 and thus vary the position of the roller abutment 849 in relation to the pivot axis 847 of the lever 846. This changing in position of the abutment 849 will effectively change the length of the portion of the lever 846 which causes horizontal reciprocation of the slide 842 and will thus also change the extent of this horizontal reciprocation. Therefore, by manipulating the operating knob 855a, adjustments in the extent of oscillation of the drive shaft 838 and the operably connected pivot shaft 801 may be effected. It has been found in practice that such adjustments may be made while the apparatus is in operation and the slide 842 is undergoing reciprocating movement.

The structural characteristics of the arm assemblies 8a and 8b are illustrated in FIGURES 12, 17 and 23. As shown in FIGURE 17, arm assembly 8a comprises a mounting block 857 having an internal aperture 857a by means of which it is slideably and rotatably mounted upon one end of the shaft 801 as shown in FIGURE 17. Mounting block 857 may be clamped in a desired position on a pivot shaft 801 by a clamping mechanism comprising a clamping rod 858 mounted in an aperture 857b of the mounting block 857 so as to extend transversely of the pivot shaft 801. Rod 858 may be provided with an indented or notched portion facing downwardly, as shown in FIGURE 17, which is adapted to clampingly engage the upper periphery of a portion of the shaft 801. A clamping knob 859 may be threadably mounted upon a threaded end portion 858a of the rod 858. By appropriately rotating the operating knob 859 so as to tend to draw the rod 858 toward the knob 859, one edge of the notched or indented portion of the rod 858 will be caused to clampingly engage the upper periphery of the pivot shaft 801 in an obvious fashion.

A generally channel shaped, arm defining frame component 860 is slideably mounted upon one side of the mounting block 857, as shown in FIGURES 17 and 23, so as to extend generally radially of the pivot shaft 801. Arm frame 860 is provided with a slot 860a extending radially of shaft 801 so as to enable the arm frame 860 to be slideably moved relative to the mounting block 857 without interferring with the pivot shaft 801. Flange portions 860b and 860c of frame 860 may pass slideably through slotted portions of the mounting block 857, as shown in FIGURE 23, so as to stabilize the sliding movement of the frame 860. Frame 860 may be slideably secured to the mounting block 857 by restraining rails 861a and 861b.

The upper end of the arm frame 860 is connected with an article engaging jaw assembly 862. A threaded rod 863 is journaled at one end in the jaw assembly 862 and at the other end is journaled in a connecting member 864 attached to the arm frame 860 as shown in FIGURE 17. Rod 863 passes threadably through an internally threaded aperture 857c of the mounting block 857. By rotating an operating end 863a of the threaded rod 863, the arm frame 860 may be moved radially with respect to the pivot shaft 801. In this fashion, the selective extension or contraction of the arm assembly 8a may be accomplished so as to position the jaw assembly 862 in conformance with the geometric requirements of a particular article to be transferred and the position of such articles at their points of transfer on the arm means of the article carrying means 6 and 7.

Jaw assembly 862, as shown in FIGURES 17 and 18, includes a pair of pivoted jaws 864 and 865, both of which are pivotally mounted upon a common pivot shaft 866. Jaw member 864 carries a laterally projecting abutment 867 while the jaw 865 caries a similar laterally projecting abutment 867'. Abutments 867 and 867' are positioned, respectively, in slotted portions 868a and 868b of a slide assembly 868 in the manner generally shown in FIGURE 18. With the illustrated arrangement, when the slide 868 is moved downwardly, away from the pivot shaft 868, the abutments 867 and 867' will be caused to move downwardly so as to pivot the jaw members 864 and 865 to the open jaw position shown in FIGURE 18. Upward movement of the slide 868 will be effective to return the jaws 864 and 865 to a closed jaw position in an obvious fashion.

Jaw actuating movement of the slide 868 is effected by a piston rod 869 which extends from the slide 868 to a piston 870 contained within a cylinder 871. Cylinder 871 may comprise an integral portion of the jaw assembly 862 as shown. As illustrated in FIGURE 18, a coil spring 872 may be provided to bias the piston 870 downwardly, so as to urge the jaw members 864 and 865 to the illustrated open jaw position.

Pressurized fluid such as compressed air may be supplied to the lower end of the cylinder 871, as shown in FIGURE 18, by way of an opening 871a so as to cause the piston 870 to be moved upwardly to effect the closing of the jaw members 864 and 865. As will be appreciated, the supplying of pressurized fluid to the cylinder 871 may be controlled by conventional control mechanisms in timed coordination with the operation of the over-all apparatus.

Structural details of the transfer arm assembly 8b are illustrated in FIGURES 12 and 23.

Arm assembly 8b includes a mounting block 873 having an apertured portion 873a by means of which the block 873 is rotatably and slideably mounted upon one end of the pivot shaft 801 as shown in FIGURE 17. The mounting block 873 is clamped and locked in position on the pivot shaft 801 by a clamping mechanism comprising a recessed rod 874 which passes through a lateral block aperture 873a. Clamping rod 874 includes a threaded portion 874a upon which an internally threaded clamping knob 875 is mounted. Clamping knob 875 and rod 874 cooperate to clamp the block 873 to the rod 801 in a manner identical to that previously described in connection with the clamping action of the clamping knob 859 and the clamping rod 858 associated with the mounting block 857 of the arm assembly 8a.

An arm frame 876 is slideably mounted upon the mounting block 873 as shown in FIGURES 17 and 23. Arm frame 876 comprises spaced side portions 876a and 876b which may be slideably secured on recessed portions of the mounting block 873 by a restraining plate 877 in the manner generally shown in FIGURES 12 and 23. With this mounting arrangement, the arm frame 876 may be moved generally radially with respect to the pivot shaft 801.

The lower ends of the frame side portions 876a and 876b, as shown in FIGURE 17, may be connected by a laterally extending connecting portion 876c. The upper ends of the frame side portions 876a and 876b are connected to and support an article engaging assembly 878. An externally threaded rod 879 may be journaled at its upper end in the assembly 878 at its lower end in the connecting portion 876c, as generally shown in FIGURE 17. Threaded rod 879 is threadably engaged with an internally threaded, apertured portion 873c in the mounting block 873. By rotating an operating end 879a of the threaded rod 879, the arm frame 876 may be caused to be moved generally radially with respect to the pivot axis 801 in an obvious fashion so as to effect positional adjustments of the article engaging assembly 878. Such adjustments in the extended or retracted position of the arm assembly 8b allow the assembly 8b to be accommodated to particular geometric configurations of articles being handled by the apparatus and to the positions of the arm means of the article carrying means 6 and 7 at the points of article transfer.

Article engaging assembly 878 comprises a fitting 880 including a vacuum cup, article engaging component 881 and a coupling portion 882 adapted to be connected to a vacuum source. A conduit portion 880a of the fitting 880 provides communication between the coupling portion 882 and the interior of the vacuum cup 881. A vacuum condition may be formed in the vacumm cup 881 under the influence of conventional control means so as to supply an article securing vacuum force in the vacuum cup 881 in timed relation for the operation of the over-all apparatus.

Fitting 880 may be pivotally mounted on the assembly 878 by means of a stub axle, cantilever type pivotal mounting 883 extending from the fitting 880 and passing through an aperture in an upper portion 878a of the assembly 878, as shown in FIGURE 17. A clamping nut 883a may be mounted upon a threaded end of a stub axle 883 so as to enable the fitting 880 to be clamped at a particular position of inclination with respect to the frame 876. With this pivotal mounting arrangement, the vacuum cup 881 may be appropriately oriented for flush engagement with an article portion which it is to secure.

With the structural characteristics of the transfer means 8 heretofore described, it will be appreciated that this apparatus component may be readily accommodated to the handling of a variety of article configurations. By changing the elevation and degree of inclination of the pivot shaft 801 through manipulation of the mechanisms described above, the pivot shaft 801 may be disposed so as to pivot about the requisite transfer axis Z corresponding to articles to be printed. With the pivot shaft 801 once thus positioned, the extent of oscillation of the shaft 801 and the positions of the article engaging jaw assembly 862 and the vacuum cup 881 may be appropriately adjusted so as to receive articles from the article carrying means 6 and to effect the transfer of such articles to the article carrying means 7.

As previously noted in connection with FIGURES 1–A through 1–E and FIGURES 2 through 9, articles are immoveably supported upon the oscillatable arm assemblies 8a and 8b of transfer arm means 8 such that, when received from the article carrying means 6 and when transferred to the article carrying means 7, a plane passing symmetrically between the axes of curvature of the surfaces to be printed intersects the transfer axis Z. For this reason, with the article engaging components illustrated, it is desirable for the vacuum cup 881 and the jaw 862 to be disposed on the arm assemblies 8b and 8a, respectively, so as to be symmetrically aligned with a radial plane extending from the transfer axis Z of the pivot shaft 801. This arrangement of components allows an article to be secured by a vacuum force applied between the surfaces being printed and be engaged by component generally symmetrically disposed on the article.

As noted earlier, the application of vacuum to the vacuum cup 881 and the introduction of pressurized fluid into the cylwinder 871 may be effected under the influence of conventional control mechanisms. The vacuum pressurized fluid will be supplied so as to cause an article moved by the article carrying means 6 to the position of article transfer, as shown, for example, in FIGURE 1–C, to be engaged and supported by the vacuum cup 881 and jaws 864 and 865 of the transfer means 8, whereupon the article may be relased by the article carrying means 6 in a manner to be hereinafter described. After the transfer means 8 has swung an article to the end of the transfer arc so that it assumes the position shown in FIGURES 1-A and 1-E, and as or after the article is engaged by the article carrying means 7, the vacuum and pressurized fluid may be interrupted. This action will allow the jaws 864 and 865 to open and the vacuum cup 881 to be released from the article periphery so that the article may be supported wholly by the article carrying means 7 and freed from the transfer means 8.

*Article Carrying Arm Means*

As shown in FIGURES 8, 9, 12, 14 and 27, and as before noted, the article carrying means 6 comprises a first arm assembly 6a and a second arm assembly 6b.

Arm assembly 6a includes a generally L-shaped base 601 comprising a vertically and upwardly extending portion 601a and a horizontally extending portion 601b. The arm base 601 is mounted on the left side of carriage pedestal 902 shown in FIGURES 8 and 9 for sliding movement toward or away from the arm assembly 6b by means such as the schematically illustrated, dovetailed rail assemblies 602 and 603 shown in end view.

Arm assembly 6b comprises an arm base 604, including a vertically and upwardly extending portion 604a and a horizontally extending portion 604b. Base 604 is mounted for horizontal sliding movement on the left side (when viewed as shown in FIGURE 9) of the carriage pedestal 903 by means such as dovetail rail assemblies 602' and 603' which correspond to and are aligned with the rail assemblies 603 and 602.

As previously noted, article carrying means 7 comprises a first, arm assembly 7a and a second, arm assembly 7b horizontally spaced therefrom.

Arm assembly 7a includes a base 701 having a generally vertically and upwardly extending portion 701a and a horizontally extending portion 701b. Base 701 is mounted for horizontal sliding movement on the right side (when viewed as shown in FIGURE 9) of the carriage pedestal 902 by means such as the schematically illustrated dovetail rail assemblies 702 and 703 as shown in FIGURE 8.

Arm assembly 7b includes a base member 704 having a generally vertically and upwardly extending portion 704a and a horizontally extending portion 704b. Base 704 is mounted on the right side of the carriage pedestal 903 for horizontal sliding movement toward or away from the arm assembly 7a by means such as dovetail rail assemblies 702' and 703' corresponding to and aligned with the rail assemblies 702 and 703, as shown in FIGURE 28.

The manner in which the two arm assemblies of each of the article carrying means 6 and 7 may be relatively converged or separated so as to to accommodate to the length of particular articles being printed, is illustrated in connection with the arm assemblies 7a and 7b in FIGURE 14. As there shown, threaded rod 705 is journaled in bracket portions 706 and 707 mounted, respectively, upon carriage pedestals 902 and 903. One portion 705a of the adjusting rod 705 is threaded in one direction and engaged with an internally threaded aperture on a laterally extending flange portion 704c of the base 704 as shown in FIGURE 14. Another portion 705b of the adjusting rod 705 is threaded in a direction opposite to the threading of the portion 705a and is threadably engaged with an internally threaded aperture formed in a laterally projecting flange portion 701c carried by the base 701. Adjusting rod 705 is provided with an operating knob 708 by means of which the rod 705 may be rotated so as to effect either relative convergence or separation of the bases 701 and 704 as a result of the oppositely threaded character of the rod portions 705a and 705b.

An adjusting mechanism identical to that described for effecting the convergence or separation of the bases 701 and 704 may be employed to effect relative convergence or separation of the bases 601 and 604 of the arm assembly 6. In order to simplify the presentation of the invention, this identical adjusting mechanism is not illustrated.

Article carrying means 6 and article carrying means 7 each includes identical pivoted arm and article engaging components. To simplify the presentation of the invention, the structural details of the arm and article engaging components will be described only in connection with the arm assemblies 7a and 7b.

As shown in FIGURE 27, a shaft 709 is horizontally journaled in an upper end of the base portion 701a of the arm assembly 7a. A mounting block 710 is rigidly mounted on the end of the shaft 709 facing the arm assembly 7b is illustrated. An arm defining frame 711 is mounted for sliding movement on the block 710 generally radially of the shaft 709. A threaded adjusting rod 712 is journaled in opposite ends of the slidable frame 711 and passes threadably through an internally threaded aperture 710a of the mounting block 710 as shown. As will be appreciated, by engaging an end 712a of the threaded rod 712 and turning this rod, the frame 711 may be extended or contracted radially of the shaft 709 so as to selectively vary the position of an article engaging assembly 713. Assembly 713 is mounted on the frame 712 for vertical pivotal movement about a pivot mounting 714, the axis of which extends generally perpendicular to a plane extending from the pivot axis of the shaft 709.

Arm assembly 7b includes a shaft assembly 715 journaled in an upper end of the vertical base portion 704a so as to be coaxial with the shaft assembly 709 of the arm assembly 7a. Shafts 709 and 715 are both disposed so as to be coaxial with and define the article transfer axis Y.

A mounting block 716 is carried on the end of the shaft assembly 715 and faces the arm assembly 7a. An arm defining frame 717 is slideably mounted on the block assembly 716 for generally radial movement relative to the shaft assembly 715. An externally threaded adjusting rod 718 is journaled at opposite ends in the frame 717 and passes through an internally threaded, apertured, portion 716a of the mounting block 716. By rotating an end 718a of the adjusting rod 718, the slide 717 may be moved radially with respect to the mounting block 716 so as to extend or retract relative to the shaft 715 and thus adjust the position of an article engaging assembly 719 carried thereby. Assembly 719 is mounted by means of a pivot mounting 720 on the upper end of the frame 717 as shown in FIGURE 27. Desirably, article engaging assemblies 713 and 719 are axially aligned so as to facilitate the support of articles with the axis of curvature of one article surface disposed coaxial with the pivot axes 709 and 715 and thus the article carrying axis Y.

The ability of the arm frames 711 and 717 to be extended or contracted radially of the pivot axis Y permits the article carrying means 7 to accommodate a range of curvature radii of article surfaces to be printed. As will be appreciated, where articles are being handled having converging surfaces to be printed, it will be necessary to support such articles with their central or median bottle axes inclined so as to effect the alignment of the curvature axis of one surface with the article carrying pivot axis Y. The individually extensible character of the frames 700 and 717 readily accommodate the arm assemblies 7a and 7b to supporting articles in such positions of inclination. The pivotal character of the article engaging assemblies 713 and 719 enables these components to remain axially engageable with an article, even when the article is received in such an inclined position, so as to provide optimum article support.

Structural details of the article engaging assemblies 713 and 719 are illustrated in FIGURES 25 and 26.

As shown in FIGURE 25, article engaging assembly 713 comprises a housing 721 defining a cylinder within which is mounted a piston assembly 722. A piston rod 723 extends through one end 721a of the housing 721 and is provided at its outer end with a generally conically shaped article engaging, plunger component 724. Piston rod 723 may pass slideably through a stabilizing bracket 713a carried by the housing 721 as shown at FIGURES 25 and 27.

Piston assembly 722, and thus the article engaging component 724, are biased to a retracted position out of article engaging position by means of a coil spring 725 as shown in FIGURE 25. Pressurized gas such as compressed air, when supplied to an aperture 721b in one end of the housing 721, will urge the piston assembly 722 to the right as shown in FIGURE 25 so as to cause the article engaging component 724 to be moved outwardly into article engaging position. Extension of the component 724 may be limited by an abutment collar portion 721c of the housing end 721a which is adapted to engage an enlarged portion 723a of the piston rod 723.

Where articles such as plastic bottles are being printed, it may be desirable to provide pressurized fluid support for each bottle interior during the printing operation. Pressurized gas for this purpose may be supplied through a housing aperture 721d. Pressurized gas applied to the body aperture 721d communicates with an annular recess 722a formed on the outer periphery of the piston assembly 722 when the piston is in the article engaging or extended position. Annular recess 722a communicates with radially extending passage means 722b which in turn communicate with an axially extending passage 723b in the piston rod 723. Passage 723b opens in an outlet 724a at the leading end of the article engaging, plunger component 724 as illustrated. With the component 724 engaged with an article such as the article shown in phantom line in FIGURE 27, pressurized fluid supplied at the housing opening 721d will be transmitted to the article interior to support the article periphery during the printing operation.

As will be appreciated, conventional control mechanisms may be employed to control the introduction of pressurized gas into the openings 721b and 721d of the body 721 in timed coordination with the operation of the over-all printing mechanism.

Housing 721 is pivotally mounted upon the frame 711 by means such as the illustrated stub axles 726 and 727 shown in FIGURE 25, which define the pivot mounting 714. Stub axle 726 provides a pivotal connection between one side 711a of the frame 711 and the body 721, as illustrated. Stub axle 727 similarly provides a pivotal connection between an opposite side 711b of the frame 711 and the body 721 and is coaxially aligned with stub axle 726. Clamping bolts 728 and 729 may be provided to securely clamp the article engaging assembly 713 in various selected positions of inclination with respect to the frame 711. As illustrated in FIGURES 25 and 27, the clamping bolt 728 is threadably mounted in the housing 721 and passes through an arcuate slot 711c in the frame side 711a. Similarly, the clamping bolt 729 is threadably mounted in the housing 721 and passes through an arcuate slot 711d in the frame side 711b, which slot 711d is generally aligned with the slot 711c. In an obvious fashion, by loosening the clamping bolts 729 and 728 the assembly 713 may be pivoted about the shafts 726 and 727 until the desired position of inclination is achieved. By retightening the bolts 729 and 728, the assembly 713 will be clamped rigidly in its inclined position.

Article engaging assembly 719 includes a housing 730 which defines a cylinder within which a piston 731 is mounted. A piston rod 732 extends from the piston 731 through an end 730a of the housing 730 and terminates in a mounting shoe 733. A generally concave article engaging plunger component 734, shown in phantom line in FIGURES 26 and 27, configured to conform to the shape of an article end, is mounted on the shoe 733 by conventional fastening means not shown. Movement of the piston 731 and component 734 outwardly to engage an article may be limited by an abutment collar portion 730c of housing end 730a which is adapted to engage an enlarged portion 732a of piston rod 732 as shown in FIGURE 26. The desired alignment of component 734 in relation to housing 730 may be maintained by a guide rod 733a, schematically illustrated in FIGURE 27. Guide rod 733a is rigidly attached to shoe 733 and passes slideably through a guideway, not shown, on housing 730 in an obvious and conventional fashion to prevent component 734 from rotating about its axis while being extended or retracted.

A coil spring 735 is provided in the housing 730 to engage and bias the piston 731 to the right as shown in FIGURE 26 so as to urge the component 734 to a position away from the article engaging position. When pressurized gas such as air is applied to the interior of the housing 730 through an aperture 730b so as to act upon the piston 731, the piston 731 is urged to the left as shown in FIGURE 26 to overcome the biasing effect of the coil spring 735 and thus cause the component 734 to be moved to an article engaging position.

The introduction of air into the aperture 730b of the housing 730 to effect the movement of the article engaging component 734 into article engaging position may be governed by conventional control means effected in a variety of ways depending upon the character of the oscillating strokes of the arm means 7. It will be understood, of course, the component 734 will be extended in coordination with the extension of component 724 so that opposite ends of an article are substantially simultaneously, axially engaged by them.

Housing 730 is disposed between side portions 717a and 717b of the frame 717 and pivotally connected with these side portions by coaxially aligned pivot shafts 736 and 737 which define the pivot mounting 720. Clamping bolts 738 and 739 serve to clamp the housing 730 in desired positions of inclination with respect to the frame 717 in a manner identical to that in which the clamping bolts 728 and 729 function to clamp the body 721 to the frame 711.

As earlier noted, arm assembly 7a corresponds in structure adjustability and operation to arm assembly 6a, while arm assembly 7b corresponds in structure, adjustability and operation to arm assembly 6b. Arm assembly 6a includes a pivot shaft 605 corresponding to the pivot shaft 709, a mounting block 606 corresponding to the mounting block 710, a radially extensible frame 607 corresponding to the frame 711 and an inclinable article engaging assembly 608 corresponding to the article engaging assembly 713. Similarly, arm assembly 6b includes a pivot shaft 609 corresponding to the pivot shaft 715, a mounting block 610 corresponding to the mounting block 716, a radially adjustable frame 611 corresponding to the frame 717 and an inclinable article engaging assembly 612 corresponding to the assembly 719.

Shaft 605 and 609 are coaxially aligned with and define the article carrying pivot axis X. Article engaging assemblies 608 and 612 are preferably axially aligned to facilitate the support of an article with the axis of curvature of one surface to be printed disposed in coaxial relationship with the pivot axis X.

The article engaging components of the arm means 6 and 7 are actuated in timed coordination with the operation of the infeed conveyer 10, the outfeed conveyer 14 and the article engaging, jaw and vacuum cup components of the transfer arm means 6. The actuation of the article engaging components, as previously noted, is governed by conventional control mechanisms. In general, it may be stated that such mechanisms cause the article engaging components of the article carrying means 6 to release an article simultaneously with or subsequent to the time when the article engaging components of the transfer means 8 engage and support an article at the article transfer point, depending upon whether or not the arm means of the components 6 and 8 are held for a dwell period at their transfer point. Similarly, the article engaging components of the transfer means 8 are actuated to release an article simultaneously with or subsequent to the time when the article engaging components of the article carrying means 7 engage an article, depending upon whether or not the arm means of components 8 and 7 are held for a dwell period at their point of article transfer. Obviously, control criteria of the same nature as those described above apply to the actuation of the article engaging components of the article carrying means 6 to receive articles from the infeed conveyer 10 and to the actuation of the article engaging components of the article carrying means 7 to transfer articles to the outfeed conveyer 14.

As will be appreciated, with the arrangement of article engaging components described, article carrying arm means 6 and article carrying arm means 7 each includes axially aligned, plungerlike article engaging components which converge axially upon opposite ends of an article to be engaged and thus positively secure the article during indicia forming operations. The article engaging components carried on the transfer arm means 8 engage the article between the plunger means of the article carrying arm means 6 or 7 yet do not engage the portions of the articles which receive indicia. The pivoted jaws of the transfer arm means 8 are adapted to engage an article portion such as a container neck spaced from the article surfaces to receive indicia while the vacuum cup of the transfer arm means 8 engages an article edge between these surfaces. With these article engaging arrangements, the possibility of damaging freshly printed surfaces is effectively avoided.

Article carrying means 6 and article carrying means 7 each includes a drive mechanism for effecting the coordinated and aligned oscillation of the two arm assemblies comprising each such arm means. The structural details of such drive mechanisms will be described only with reference to the mechanism included in article carrying means 7. The structural details of the drive mechanism embodied in the article carrying means 6, being identical to the drive mechanism of the article carrying arm means 7, is not illustrated.

As shown in FIGURE 27, the drive mechanism incorporated in the article carrying means 7 comprises a drive shaft 740 journaled in brackets 741 and 742 of the horizontal portion 704b of the arm assembly 7b and a drive shaft 743 journaled in brackets 744 and 745 of the horizontally extending portion 701b of the arm assembly 7b. Shafts 743 and 740 are telescopingly interconnected by a schematically illustrated conventional, telescoping, and spline joint so as to enable them to remain in mutually engaged relationship when the assemblies 7a and 7b are converged or separated for adjustment purposes as heretofore described.

As shown in the drive arrangement illustrated in FIGURE 27, the shaft 740 carries a bevel gear 736 which is meshingly engaged with a bevel gear 747 carried on a vertically extending shaft 748. Shaft 748 is journaled in brackets 749 and 750 which are mounted in the vertically extending portion 704a of the arm assembly 7b. A bevel gear 751, mounted on the upper end of the shaft 748, meshingly engages a bevel gear 752 which is mounted upon the pivot shaft 715 as shown.

Similarly, a bevel gear 753 mounted on the shaft 743 meshingly engages a bevel gear 754 mounted on the lower end of the vertically extending shaft 755. Shaft 755 is journaled on brackets 756 and 757 in the portion 701a of the arm assembly 7a. A bevel gear 758 mounted on the upper end of the shaft 755 is meshingly engaged with a bevel gear 759 mounted upon the pivot shaft 709.

With the drive arrangement heretofore described, it will be appreciated that rotation of the shaft 740 will be transmitted to the shaft 743 so that these shafts rotate as a unitary assembly. The rotation of this shaft assembly, through means of the described bevel gear arrangement, effects coordinated and concurrent rotation of the pivot shafts 709 and 715 about the article transfer axis Y.

Oscillation of the shaft 740 for the purpose of effecting oscillation of the pivot shafts 709 and 715 is effected by imparting oscillating motion to a sector gear 760 mounted upon the right end of the shaft 740, as viewed in FIGURE 27, so as to be spaced beyond the right side of the arm assembly 7b. Where the shaft 740 passes through the right end of the assembly 7b, as shown in FIGURE 27, shaft supporting means such as the schematically illustrated bearing assembly 761 may be provided which are mounted on assembly 7b.

Article carrying means 6 is provided with a drive mechanism identical to that described in connection with the article carrying means 7 for effecting the coordinated and concurrent rotation of the shaft 605 and 609. As shown in FIGURE 28, the drive mechanism of article carrying means 6 is adapted to be actuated by oscillating a sector gear 613 corresponding to the sector gear 760.

A mechanism for effecting concurrent oscillation of the shafts 709, 715, 609 and 605 so as to cause the aligned frames 607 and 611 of the article carrying means 6 to move in unison and in parallel relationship with the aligned frames 711 and 717 of the article carrying means 7 is illustrated in FIGURES 12, 21, 27 and 28.

As shown in FIGURES 12, 27 and 28, a slide 81 is mounted for horizontal sliding movement on the carriage pedestal 903. As illustrated in FIGURE 12, a bracket 82 mounted on the pedestal 903 may support dovetail rails 83 and 84 by means of which the slide 81 is supported for such horizontal sliding movement.

Slide 81 carries a toothed rack 85 which, as shown in FIGURES 12, 27, and 28, meshingly engages sector gear 760 as well as sector gear 613. Thus, horizontal reciprocation of the slide 81 is effective to cause these gears to be oscillated in unison. As will be appreciated, this connection between the article oscillating components of the article carrying means 6 and the article carrying means 7 will be effective to cause articles simultaneously supported by these arm means to be moved in unison during a printing operation.

Sector gears 760 and 613 each have substantial horizontal width such that, as shown in FIGURE 27 in connection with the sector gear 760, meshing engagement between these gears and the toothed rack 85 may be maintained during relative converging movement of the arm assemblies 7a and 7b as well as 6a and 6b.

Slide 81 may be horizontally reciprocated by a mechanism including a vertically extending and outwardly facing channel member 86, a drive shoe 87 mounted for vertical sliding movement in the channel 86, and a horizontally reciprocable drive bar 88. Drive bar 88 may be supported for horizontal sliding movement by brackets 89 and 90 attached to a frame portion 91. Drive bar 88 may be connected to the drive shoe 87 by a bracket portion 92 as illustrated in FIGURES 12 and 27. As will be obvious by reference to the aforenoted illustrations, horizontal reciprocation of the drive bar 88 will effect horizontal reciprocation of the slide 81. The driving relationship between the drive bar 88 and the slide 81 is maintained throughout the various positions of elevation of the carriage 9 by means of the slideable connection between the drive shoe 87 and the slide attached channel 86.

Drive bar 88 is horizontally reciprocated by a mechanism illustrated in FIGURES 21 and 28. This mechanism includes a lever 93 mounted for oscillating pivotal movement on a pivot joint 94 carried by a frame bracket portion 95. A connecting pin 96 at the left end of the drive bar 88, as shown in FIGURE 28, intersects a longitudinally extending slot 93a in the upper portion of the lever 93 so as to provide a driving connection between the lever 93 and the drive bar 88.

Lever 93 is oscillated about the pivot mounting 94 by means of a second lever 97, pivotally secured by a pivot mounting 98 to the frame portion 28g, as shown in FIGURE 28. A connecting roller 99 slideably intersects an axially extending slot 93b in the lower portion of the lever 93 and is mounted on the upper end of the lever 97 so as to provide a driving connection between the levers 97 and 93. Roller 99 is carried on a block 100 which is adjustably mounted in a slot 97a longitudinally extending along an upper portion of the lever 97 as shown in FIGURES 21 and 28.

A roller type, cam follower 101 is carried on the right side of the lever 97 as shown in FIGURE 28 and is adapted to engage the left camming side of a rotatable cam 102 mounted on the drive shaft 93S.

Follower 101 is held in camming engagement with the cam 102 by means such as a coil tensioning spring 103 extending from a frame portion 104 to the left end of the drive bar 88 as shown in FIGURE 28. Coil spring 103 urges drive bar 88 to the left as shown in FIGURE 28 so as to tend to pivot the lever 93 counterclockwise and thus, in turn, cause the lever 97 to tend to be pivoted clockwise and urge the follower 101 against the cam 102. As will be appreciated, the left side of the cam 102 will be appropriately configured in a conventional manner so as to effect the desired oscillating stroke of the lever 97 to in turn cause oscillation of the drive bar 88.

In order to accommodate to particular article or apparatus requirements, it may be desirable to vary the arcs of oscillation of the article carrying means 6 and 7. A mechanism for accomplishing such adjustments illustrated in FIGURES 21 and 28. This mechanism includes a threaded adjusting rod 105 journaled in the pivoted lever 97 and threadably engaged with an internally threaded aperture of the mounting block 100. A bevel gear 106 mounted on the lower end of the adjusting rod 105 is meshingly engaged with a bevel gear 107 which is mounted on a horizontal shaft 108. Shaft 108 is journaled in brackets 109 and 110 mounted on the frame portion 28g. As schematically illustrated in FIGURE 21, pivot joint 98 of the lever 97 is defined by wing portions 97b and 97c of the lower end of the lever 97 which are journaled between the brackets 110 and 109 so as to be freely rotatable coaxially about the adjusting shaft 108.

As will be appreciated, a free end 108a of the adjusting shaft 108 may be engaged and rotated so as to effect rotation of the threaded rod 105 and thus effect adjustments of the position of the block 100 and the connecting roller 99 axially along the length of the lever 97. By thus adjusting the effective length of the lever 97, the extent of oscillation of the intermediate lever 93 and the drive bar 88 are adjusted so as to alter, as desired, the extent of the oscillating strokes of the arm means of the article carrying means 6 and 7.

With the apparatus in operation and the lever 97 pivoting about the pivotal mounting 98, it will be appreciated that the intermeshed characters of the bevel gears 106 and 107 will induce some oscillating movement of the adjusting shaft 108. However, in practice, it has been found that such oscillating movement may be effectively overridden by an operator so that desired changes in the extent of oscillation of the arm means of the article carrying means 6 and 7 may be accurately and conveniently effected even while the apparatus is in motion.

FIGURES 12 and 27 illustrated a drive mechanism for jointly effecting the oscillation of the arm means of the article carrying means 6 and 7 and the horizontal reciprocation of the screen frame 57 which supports the silk screen units 2 and 3. This particular drive mechanism includes a lever 111 pivotally mounted upon a supporting block 112. Block 112 is carried in a vertically extending trackway 113.

A connecting pin 114 carried by the drive bar 88 projects laterally and slideably into a slot 111a extending longitudinally along a lower portion of the lever 111, as shown in FIGURES 12 and 28, so as to provide a driving connection between the drive bar 88 and the lever 111.

As shown in FIGURE 12, frame 57 carries a pair of horizontally extending toothed racks 115 and 116 which are meshingly engaged with gears 117 and 118, both of which gears are mounted upon a shaft 119. Shaft 119 is rotatably journaled in frame bracket portions 120 and 121 which may be supported upon the guide rods 77 and 78 as illustrated. An outer end 119a of the shaft 119 may be rotatably supported by means such as the schematically illustrated, bearing assembly 122 which is supported by a frame portion 123 as shown in FIGURE 12. A gear 124 mounted on the shaft portion 119a meshingly engages a toothed rack 125 which is mounted for horizontal reciprocating movement paralleling the reciprocation direction of the drive bar 88. Toothed rack 125 is mounted for such horizontal movement upon a slide 126 which is dovetail connected to a slide trackway 127 as illustrated in FIGURE 12.

A connecting pin 128 projects laterally outwardly from the slide 126 and intersects a slot 111b extending longitudinally of an upper portion of the lever 111 as shown in FIGURES 12 and 28, so as to provide a driving connection between the lever 111 and the toothed rack 125. As will thus be appreciated, oscillation of the lever 111 will induce oscillation of the shaft 119 through the cooperating action of the intermeshed gear 124 and the toothed rack 125. Oscillation of the shaft 119 will in turn effect horizontal reciprocation of the screen frame 57 by means of the intermeshed gear 118 and toothed rack 116 and the intermeshed gear 117 and the toothed rack 115. As will be appreciated, with the arrangement described, horizontal reciprocation of the drive bar 88 will thus induce rightward movement of the screen frame 57 concurrently with clockwise pivotal movement of the arm means of article carrying means 6 and 7, as shown in FIGURE 28, and leftward movement of the screen frame 57 concurrently with counterclockwise pivotal movement of these arm means. In this manner, articles carried by the arm means of article carrying means 6 and 7 are moved in unison so as to be brought into simultaneous, tangential, indicia forming engagement with the screen units 2 and 3, carried by the frame 57.

As will be appreciated, articles of diverse geometric character will be supported at varying distances from the pivot axes X and Y. Because of this, it may be necessary to change the operative elevation of the carriage 9. Such a change, of course, would vary the relative rates of movement of the frame 57 and the arm means of the article carrying means 6 and 7. In order to accommodate to a variety of article positioning arrangements, but maintain tangential indicia forming contact between articles and the silk screens 2 and 3, with the article surfaces being printed and the silk screens moving at the same linear velocity at their points of contact, a drive ratio varying mechanism is incorporated in the apparatus. This mechanism, as illustrated in FIGURES 12 and 28, comprises an externally threaded, adjusting rod 129 which is journaled for rotation about a vertical axis in brackets 130 and 131 associated with trackway 113. Threaded adjusting rod 129 is threadably engaged with an internally threaded, apertured portion of the mounting block 112. A bevel gear 132 is carried on the lower end of the adjusting rod 129 and meshingly engages a bevel gear 133 carried on a horizontal adjusting shaft 134 which is journaled on the apparatus frame. By rotating a free end 134a of the adjusting rod 134, rotation of the threaded rod 129 will be induced so as to cause the block 112 to be moved vertically in the trackway 113. This movement of the block 112 will vary the relative positions of the connecting pins 128 and 114 in relation to the pivot axis 136 of the lever 111 so as to vary the rate of reciprocation of the screen frame 57 relative to the rate of oscillation of the arm means of the article carrying means 6 and 7.

As will thus be apparent, by appropriately manipulating the adjusting rod 134 the rate of oscillation of the arm means of the article carrying means 6 and 7 may be properly correlated with the rate of reciprocation of the screen frame 57 so as to obtain the proper indicia forming contact between articles carried by these arm means and the silk screens 2 and 3. As will be further apparent, such adjustment may be expeditiously and accurately accomplished while the apparatus is in motion.

Summary of Principal Advantages of Invention

In describing the preferred method and apparatus embodiments of the invention, the manifold advantages provided by the invention have been made apparent.

A principal advantage of the invention resides in the provision of a method and apparatus by means of which indicia may be accurately formed on multiple surfaces of sequentially fed articles, which surfaces may be relatively inclined. Significantly, during the indicia forming operations, articles are positively supported and manipulated to a minimum extent.

An additional principal advantage of the invention evolves from the described article handling technique wherein, while an article is supported upon any movable arm component, its position remains substantially unchanged in relation to that component. In this manner, registration inaccuracies of the type normally associated with position changing or reorienting devices are avoided.

Further advantages are obtained through the unique and heretofore described multiple arc, article handling techniques in which, in the preferred embodiment, an article is moved through two printing arcs and an intermediate transfer arc. This technique promotes registration and printing accuracy and requires minimum article manipulation.

A further principal advantage of the invention involves the simultaneous forming of indicia on two articles in such a manner that consecutively fed articles are printed on each of two oppositely disposed surfaces. This disclosed indicia forming technique provides a rapid, yet accurate, indicia forming operation.

Yet another advantage of the invention resides in the manner in which the article engaging components of the apparatus effectively support an article throughout the indicia forming and article transfer operations without disturbing the article surfaces where indicia are formed.

A still further advantage of the invention entails the manner in which an apparatus of the type described may be employed to accommodate an especially wide variety of article configurations through means of the variously described adjusting mechanisms. Particular benefits are derived from the ability of these adjusting mechanisms to be manipulated while the apparatus is in operation and its components are in motion.

The method and apparatus aspects of the invention have been described with reference to preferred and illustrated embodiments. However, those having ordinary skill in the art will recognize that departures from the invention as disclosed may be effected involving additions, deletions, substitutions or modifications in the preferred embodiments without departing from what is deemed to be the scope of the invention as defined in the appended claims. For example, it will be apparent that the utility of the invention is not limited to use in conjunction with horizontally reciprocating, two section, silk screen printing devices or with the specifically described, article carrying, article transfer, article conveying, operating, or adjusting components.

The disclosed and preferred apparatus was described only with reference to techniques for printing symmetrical articles, i.e. articles having two surfaces to be printed each of which has substantially the same radius of curvature. However, as will be obvious to those having ordinary skill in the printing art, when provided with knowledge of this invention, the invention may be utilized informing indicia on non-symmetrical articles as well. Such articles may be handled in a manner within the purview of this invention by making appropriate changes in the relative positioning and orientation of the two printing screens, the two article carrying means, and the transfer means.

What is claimed is:

1. An apparatus for moving articles in substantially tangential, indicia forming contact with indicia forming means so as to form indicia on a first surface of each article which is curved in substantially uniform cylindrical curvature about a first surface axis and so as to form indicia on a second surface of such article which is curved in substantially uniform cylindrical curvature about a second surface axis, said apparatus comprising:

first article carrying means adapted to move an article through a first arc about a first arc axis and adapted to support said article while moving through said first arc with its first surface facing generally away from said first arc axis so as to be disposed for substantially tangential, indicia forming contact with a portion of said indicia forming means, with said article being supported while moving through said first arc so that said first surface axis and said first arc axis substantially coincide;

second article carrying means adapted to move said article through a second arc about a second arc axis and adapted to support said article while moving through said second arc with its second surface facing generally away from said second arc axis so as to be disposed for substantially tangential, indicia forming contact with a portion of said indicia forming means, with said article being supported while moving through said second arc so that said second surface axis and said second arc axis substantially coincide; and transfer means adapted to receive an article from said first article carrying means after the first surface thereof has received indicia and to move said article to said second article carrying means so that said article, when positioned on said second article carrying means, may be moved through said second arc with its second surface facing generally away from said second arc axis and with its second surface axis substantially coinciding with said second arc axis.

2. An apparatus as described in claim 1 including:

first article engaging means carried by said first article carrying means and comprising paired plunger means adapter to axially converge upon and engage opposite ends of an article;

second article engaging means carried by said second article carrying means and comprising paired plunger means adapted to axially converge upon and engage opposite ends of an article;

third article engaging means carried by said transfer means and comprising
jaw means adapted to engage articles between said plunger means of said first article carrying means and between said plunger means of said second article carrying means but outside of portions of article surfaces upon which indicia are to be formed.

3. An apparatus for forming indicia on articles, by means of which apparatus indicia is to be formed on a first surface of each article which curves in substantially uniform cylindrical curvature about a first surface axis and indicia is also to be formed on a second surface of each article which curves in substantially uniform cylindrical curvature about a second surface axis different from said first surface axis, said apparatus comprising:

indicia forming means for forming indicia on said first and second article surfaces;

first article carrying means pivotable about a first pivot axis and adapted to support an article with its first surface facing generally away from said first pivot axis so as to be disposed for substantially tangential, indicia forming contact with a portion of said indicia forming means, with said article being supported so that said first surface axis and said first pivot axis substantially coincide;

second article carrying means pivotable about a second pivot axis and adapted to support an article with its second surface facing generally away from said second pivot axis so as to be disposed for substantially tangential, indicia forming contact with a portion of said indicia forming means, with said article being supported so that said second surface axis and said second pivot axis substantially coincide; and transfer means adapted to receive an article from said first article carrying means after the first surface thereof has received indicia and to move said article to said second article carrying means such that said article is positioned on said second article carrying means with the second surface thereof facing generally away from said second pivot axis so as to be disposed for substantially tangential, indicia forming contact with a portion of said indicia forming means, with said article being positioned so that said second surface axis and said second pivot axis substantially coincide.

4. An apparatus for forming indicia on articles, by means of which apparatus indicia is to be formed on a first surface of each article which curves in substantially uniform cylindrical curvature about a first surface axis and indicia is also to be formed on a second surface of each article which curves in substantially uniform cylindrical curvature about a second surface axis inclined with respect to said first surface axis, said apparatus comprising:

indicia forming means for forming indicia on said first and second article surfaces;

first article carrying means, pivotable about a first pivot axis and adapted to support an article with its first surface facing generally away from said first pivot axis so as to be disposed for substantially tangential, indicia forming contact with a portion of said indicia forming means, with said article being supported so that said first surface axis and said first pivot axis substantially coincide;

second article carrying means pivotable about a second pivot axis and adapted to support an article with its second surface facing generally away from said second pivot axis so as to be disposed for substantially tangential, indicia forming contact with a portion of said indicia forming means, with said article being supported so that said second surface axis and said second pivot axis substantially coincide; and transfer means pivotable about a third pivot axis and adapted to receive an article from said first article carrying means after the first surface thereof has received indicia and to move said article to said second article carrying means such that said article is positioned on said second article carrying means with the second surface thereof facing generally away from said second pivot axis so as to be disposed for substantially tangential, indicia forming contact with a portion of said indicia forming means, with said article being positioned so that said second surface axis and said second pivot axis substantially coincide.

5. An apparatus for forming indicia on articles, by means of which apparatus indicia is to be formed on a first surface of each article which curves in substantially uniform cylindrical curvature about a first surface axis and indicia is also to be formed on a second surface of each article which curves in substantially uniform cylindrical curvature about a second surface axis inclined with respect to said first surface axis, said apparatus comprising:

silk screen printing means for forming indicia on said first and second article surfaces, said printing means comprising horizontally reciprocable, horizontally disposed and spaced, first and second silk screen printing surfaces;

first article carrying arm means pivotable about a first horizontal pivot axis and adapted to support an article with its first surface facing generally away from said first pivot axis so as to be disposed for substantially tangential, indicia forming contact with said first silk screen printing surface, with said article being supported so that said first surface axis and said first pivot axis substantially coincide;

second article carrying arm means pivotable about a second horizontal pivot axis and adapted to support an article with its second surface facing generally away from said second pivot axis so as to be disposed for substantially tangential, indicia forming contact with said second silk screen printing surface, with said article being supported so that said second surface axis and said second pivot axis substantially coincide; and transfer arm means pivotable about a third pivot axis and adapted to receive an article from said first article carrying arm means after the first surface thereof has received indicia and to move said article to said second article carrying arm means such that said article is positioned on said second article carrying arm means with the second surface thereof facing generally away from said second pivot axis so as to be disposed for substantially tangential, indicia forming contact with said second silk screen printing surface, with said article being positioned so that said second surface axis and said second pivot axis substantially coincide;

said first horizontal pivot axis and said second horizontal pivot axis being horizontally spaced in the direction of reciprocation of said silk screen printing means and extending parallel to a direction perpendicular to said direction of reciprocation;

said third pivot axis being vertically inclined and lying in a first vertical plane disposed between and parallel to said first and second pivot axes;

said third pivot axis being defined by the intersection of said first vertical plane with a second plane passing between the first and second surfaces of an article and symmetrically disposed in relation to said first and second article surface axes when said article is disposed on said first article carrying arm means and in position to be received by said transfer arm means; and said third pivot axis also being defined by the intersection of said first plane and said second plane when said article is positioned on said second article carrying arm means by said transfer arm means.

6. An apparatus for forming indicia on articles, by means of which apparatus indicia is to be formed on a first surface of each article which curves in substantially uniform cylindrical curvature about a first surface axis and indicia is also to be formed on a second surface of each article which curves in substantially uniform cylindrical curvature about a second surface axis inclined with respect to said first surface axis, said apparatus comprising:

silk screen printing means for forming indicia on said first and second article surfaces, said printing means comprising horizontally reciprocable, horizontally disposed, coplanar and spaced, first and second screen printing surfaces;

first article carrying arm means pivotable about a first horizontal pivot axis and adapted to support an article with its first surface facing generally away from said first pivot axis so as to be disposed for substantially tangential, indicia forming contact with said first silk screen printing surface, with said article being supported so that said first surface axis and said first pivot axis substantially coincide;

second article carrying arm means pivotable about a second horizontal pivot axis and adapted to support an article with its second surface facing generally away from said second pivot axis so as to be disposed for substantially tangential, indicia forming contact with said second silk screen printing surface, with said article being supported so that said second surface axis and said second pivot axis substantially concide;

drive means adapted to cause said first and second article carrying arm means to move in unison and in parallel relationship; and transfer arm means pivotable about a third pivot axis and adapted to receive an article from said first article carrying arm means after the first surface thereof has received indicia and to move said article to said second article carrying arm means such that said article is positioned on said second article carrying arm means with the second surface thereof facing generally away from said second pivot axis so as to be disposed for substantially tangential indicia forming contact with said second silk screen printing surface, with said article being positioned so that said second surface axis and said second pivot axis substantially coincide;

carriage means supporting said first article carrying arm means, said second article carrying arm means, and said transfer arm means, said carriage means being vertically reciprocable upwardly toward and downwardly away from the path of horizontal reciprocation of said silk screen printing means;

first endless conveyer means for transporting articles to said first article carrying arm means and supporting articles on said conveyer in such a position that when each article is received by said first article carrying arm means, the first surface thereof faces generally away from said first pivot axis and the first surface axis and first pivot axis substantially coincide; and second endless conveyer means for transporting articles away from said second article carrying arm means;

said first horizontal pivot axis and said second horizontal pivot axis being coplanar and horizontally spaced in the direction of reciprocation of said silk screen printing means and extending parallel to a direction perpendicular to said direction of reciprocation;

said third pivot axis being vertically inclined and lying in a first, vertical plane disposed between, equidistant from, and parallel to said first and second pivot axes;

said third pivot axis being defined by the intersection of said first vertical plane with a second plane passing between the first and second surfaces of an article and symmetrically disposed in relation to said first and second article surface axes when said article is disposed on said first article carrying arm means and in position to be received by said transfer arm means;

said third pivot axis also being defined by the intersection of said first plane and said second plane when said article is positioned on said second article carrying arm means by said transfer arm means;

said first article carrying arm means being adapted to oscillate through a first arc about said first pivot axis;

said second article carrying arm means being adapted to oscillate about said second pivot axis through a second arc equal to said first arc; and said transfer arm means being adapted to oscillate about said third pivot axis between said first and said second article carrying arm means through a third arc symmetrically bisected by said first plane.

7. An apparatus for forming indicia on articles, said apparatus comprising:
indicia forming means;
article carrying means adapted to move articles in indicia forming contact with said indicia forming means;
common drive means for simultaneously moving said indicia forming means and said article carrying means to cause each article carried by said article carrying means to move in indicia forming contact with said indicia forming means, said common drive means comprising
lever means,
pivot axis means supporting said lever means,
first connecting means on said lever means operably connected with said indicia forming means,
second connecting means on said lever means operably connected with said article carrying means; and
variable drive ratio means for varying the ratio of the distance between said pivot axis means and said first connecting means to the distance between said pivot axis means and said second connecting means.

8. An apparatus as described in claim 7:
wherein said indicia forming means comprises reciprocable silk screen printing means;
wherein said article carrying means comprises pivotable arm means;
wherein said variable drive ratio means comprises adjusting means for varying the position of said pivot axis in relation to the positions of said first connecting means and said second connecting means, said adjusting means including
threaded rod means journaled for rotation about a stationary axis,
support means carrying said pivot axis and threadably engaged with said threaded rod means, and
operating means for rotating said threaded rod means so as to move said support means therealong to progressively vary the position of said pivot axis.

9. An apparatus as described in claim 8:
wherein said first connecting means comprises first toothed rack means connected with said one end of said lever means so as to be reciprocated thereby, said toothed rack means also being connected with said silk screen printing means so as to effect the reciprocation thereof; and
wherein said second connecting means comprises
second toothed rack means connected with said other end of said lever means and adapted to reciprocate, and
gear means meshingly engaged with said second toothed rack means and connected with said arm means so as to effect the oscillation thereof in response to reciprocation of said second toothed rack means.

10. A method of moving articles in substantially tangential, indicia forming contact with indicia forming means so as to form indicia on a first article surface which is curved in substantially uniform cylindrical curvature about a first surface axis and so as to form indicia on a second article surface which is curved in substantially uniform cylindrical curvature about a second surface axis, said method comprising:
moving each article through a first arc so that the first surface thereof traverses a first cylindrical path, with the first surface axis of said first surface substantially coinciding with the pivot axis of said first cylindrical path;
forming indicia on the first surface of each article while it moves through said first arc;
moving each article through a second arc such that the second surface thereof traverses a second cylindrical path, with the second surface axis of said second surface substantially coinciding with the pivot axis of said second cylindrical path;

forming indicia on the second surface of each article while it moves through said second arc; and moving each article through a third arc between said first arc and said second arc so as to bring said article into a position where its second surface is aligned to traverse said second cylindrical path, with the second surface axis of said second surface being in substantial coincidence with the pivot axis of said second cylindrical path.

11. A method of moving articles in substantially tangential, indicia forming contact with indicia forming means so as to form indicia on a first article surface which is curved in substantially uniform cylindrical curvature about a first surface axis and so as to form indicia on a second article surface which is curved in substantially uniform, cylindrical curvature about a second surface axis inclined with respect to said first surface axis, said method comprising:

moving each article through a first arc about a first horizontal pivot axis so that the first surface thereof traverses a first cylindrical path, with the first surface axis of said first surface substantially coinciding with said first horizontal pivot axis;

forming indicia on the first surface of each article while it moves through said first arc;

moving each article through a second arc about a second horizontal pivot axis parallel to and in the same horizontal plane as said first pivot axis such that the second surface thereof traverses a second cylindrical path, with the second surface axis of said second surface substantially coinciding with said second horizontal pivot axis;

forming indicia on the second surface of each article while it moves through said second arc; and moving each article through a third arc about a third pivot axis between said first arc and said second arc so as to bring said article into a position where its second surface is aligned to traverse said second cylindrical path, with the second surface axis of said second surface being in substantial coincidence with said second horizontal pivot axis, said third pivot axis being vertically inclined and lying in a first vertical plane disposed between, equidistant form, and parallel to said first and second pivot axes, said third pivot axis being defined by the intersection of said first vertical plane with a second plane passing between the first and second surfaces of an article and symmetrically disposed in relation to said first and second article surface axes when the article is positioned at each extremity of said third arc.

References Cited in the file of this patent

UNITED STATES PATENTS 2,971,629     Black _____ Feb. 14, 1961